(12) United States Patent
Agiwal

(10) Patent No.: US 9,801,052 B2
(45) Date of Patent: Oct. 24, 2017

(54) METHOD AND SYSTEM FOR SECURING CONTROL PACKETS AND DATA PACKETS IN A MOBILE BROADBAND NETWORK ENVIRONMENT

(71) Applicant: Samsung Electronics Co. Ltd., Suwon-si, Gyeonggi-do (KR)

(72) Inventor: Anil Agiwal, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 13/917,063

(22) Filed: Jun. 13, 2013

(65) Prior Publication Data

US 2013/0336486 A1    Dec. 19, 2013

(30) Foreign Application Priority Data

Jun. 13, 2012    (IN) .......................... 2378/CHE/2012

(51) Int. Cl.
*H04W 12/04*    (2009.01)
*H04L 29/06*    (2006.01)

(52) U.S. Cl.
CPC ......... *H04W 12/04* (2013.01); *H04L 63/0471* (2013.01)

(58) Field of Classification Search
None
See application file for complete search history.

(56) References Cited

U.S. PATENT DOCUMENTS

| | | | | |
|---|---|---|---|---|
| 7,804,826 B1* | 9/2010 | Khalil | ................. | H04L 63/0272 370/389 |
| 8,331,906 B2* | 12/2012 | Forsberg | ............... | H04L 63/062 370/331 |
| 8,605,904 B2* | 12/2013 | Lin | ........................ | H04W 12/04 370/310.2 |
| 2002/0161723 A1* | 10/2002 | Asokan | .................. | G06Q 20/02 705/67 |
| 2003/0112977 A1 | 6/2003 | Ray et al. | | |
| 2003/0172303 A1* | 9/2003 | Adusumilli | ............. | H04L 29/06 726/11 |
| 2004/0120328 A1* | 6/2004 | Adrangi | .............. | H04L 12/4641 370/401 |
| 2004/0236965 A1* | 11/2004 | Krohn | ................. | H04L 63/0807 726/10 |

(Continued)

FOREIGN PATENT DOCUMENTS

FR    WO2012038249    *    3/2012

*Primary Examiner* — Peter Poltorak
(74) *Attorney, Agent, or Firm* — Jefferson IP Law, LLP

(57) ABSTRACT

The present invention provides a method and an apparatus for securing data packets and control messages in a mobile broadband network environment. In one embodiment, a mobile station and a data gateway are peers for securing data packets. That is, security context for data packets is maintained at the mobile station and the data gateway. Further, security processing for data packets is performed by the mobile station and the data gateway. In another embodiment, the mobile station and a base station are peers for securing control messages. That is, security context for control messages is maintained at the mobile station and the base station(s). Further, security processing for control messages is performed by the mobile station and the base station(s).

35 Claims, 24 Drawing Sheets

(56) References Cited

U.S. PATENT DOCUMENTS

| | | | |
|---|---|---|---|
| 2005/0135625 A1* | 6/2005 | Tanizawa | H04L 63/0428 380/270 |
| 2005/0135811 A1* | 6/2005 | Lee | H04B 10/1125 398/139 |
| 2005/0177723 A1* | 8/2005 | Huang | H04L 9/0822 713/168 |
| 2005/0223111 A1* | 10/2005 | Bhandaru | H04L 12/4604 709/236 |
| 2005/0223218 A1* | 10/2005 | Honkanen | G06F 21/10 713/155 |
| 2006/0046714 A1* | 3/2006 | Kalavade | H04M 3/54 455/428 |
| 2006/0090074 A1* | 4/2006 | Matoba | H04L 63/0272 713/171 |
| 2006/0105741 A1 | 5/2006 | Suh et al. | |
| 2006/0258356 A1* | 11/2006 | Maxwell | H04L 29/12047 455/436 |
| 2006/0276137 A1* | 12/2006 | Pummill | H04W 92/14 455/67.11 |
| 2007/0003062 A1 | 1/2007 | Mizikovsky et al. | |
| 2007/0043940 A1* | 2/2007 | Gustave | H04L 63/0272 713/150 |
| 2007/0060127 A1* | 3/2007 | Forsberg | H04L 63/061 455/436 |
| 2007/0186100 A1* | 8/2007 | Wakameda | H04L 63/0272 713/160 |
| 2007/0208864 A1* | 9/2007 | Flynn | H04L 63/02 709/227 |
| 2008/0188200 A1* | 8/2008 | Forsberg | H04W 12/04 455/410 |
| 2008/0212529 A1* | 9/2008 | Kim | H04W 72/005 370/329 |
| 2008/0232382 A1* | 9/2008 | Iwama et al. | 370/401 |
| 2008/0285749 A1* | 11/2008 | Suh et al. | 380/45 |
| 2008/0311906 A1* | 12/2008 | Suh et al. | 455/435.1 |
| 2009/0109925 A1* | 4/2009 | Nakamura | H04L 63/062 370/331 |
| 2009/0156213 A1* | 6/2009 | Spinelli | H04W 36/36 455/436 |
| 2009/0296655 A1* | 12/2009 | Tamura | H04L 47/34 370/331 |
| 2010/0080123 A1* | 4/2010 | Kahn | H04W 80/04 370/235 |
| 2010/0135249 A1* | 6/2010 | Meyer | H04W 36/02 370/331 |
| 2010/0157901 A1* | 6/2010 | Sanderovitz et al. | 370/328 |
| 2011/0004760 A1* | 1/2011 | Sharaga | H04L 9/0844 713/171 |
| 2011/0016313 A1* | 1/2011 | Jin | H04L 63/164 713/160 |
| 2011/0274086 A1* | 11/2011 | Xu | H04L 63/061 370/331 |
| 2012/0008544 A1* | 1/2012 | Nakagawa | H04B 7/2606 370/315 |
| 2013/0137398 A1* | 5/2013 | Yang et al. | 455/411 |
| 2013/0301828 A1* | 11/2013 | Gouget | H04L 9/0844 380/44 |

* cited by examiner

METHOD AND SYSTEM FOR SECURING CONTROL PACKETS AND DATA PACKETS IN A MOBILE BROADBAND NETWORK ENVIRONMENT

PRIORITY

This application claims the benefit under 35 U.S.C. §119(a) of an Indian patent application filed in the India Patent Office on Jun. 13, 2012 and assigned Serial No. 2378/CHE/2012, the entire disclosure of which is hereby incorporated by reference.

BACKGROUND OF THE INVENTION

1. Field of the Invention

The present invention generally relates to the field of mobile broadband systems, and more particularly relates to securing control and data packets in a mobile broadband network environment.

2. Description of the Related Art

Recently, several broadband wireless technologies have been developed to meet growing number of broadband subscribers and to provide more and better applications and services. For example, 3rd Generation Partnership Project 2 (3GPP2) developed Code Division Multiple Access 2000 (CDMA 2000), 1×Evolution Data Optimized (1×EVDO) and Ultra Mobile Broadband (UMB) systems. The 3rd Generation Partnership Project (3GPP) developed Wideband Code Division Multiple Access (WCDMA), High Speed Packet Access (HSPA) and Long Term Evolution (LTE) systems. The Institute of Electrical and Electronics Engineers developed Mobile Worldwide Interoperability for Microwave Access (WiMAX) systems. As more and more people become users of mobile communication systems and more and more services are provided over these systems, there is an increasing need for mobile communication system with large capacity, high throughput, lower latency and better reliability.

Millimeter-Wave Mobile Broadband (MMB) system based on millimeter waves i.e., radio waves with wavelength in range of (millimeter (mm) to 10 mm, which corresponds to a radio frequency of 30 Gigahertz (GHz) to 300 GHz, is a candidate for next generation mobile communication technology as vast amount of spectrum is available in the mmWave band. Typically, an MMB system consists of multiple MMB base stations (BSs) that cover a geographic area. In order to ensure good coverage, MMB base stations need to be deployed with higher density than macro-cellular base stations. In general, roughly the same site-to-site distance as microcell or Pico-cell deployment in an urban environment is recommended. Transmission and/or reception in an MMB system are based on narrow beams which suppress interference from neighboring MMB base stations and extend range of an MMB link. This allows significant overlap of coverage among neighboring base stations.

Unlike cellular network systems that partition a geographic area into cells with each cell served by one or few base stations, the MMB base stations form a grid with a large number of nodes to which an MMB mobile station can communicate. The MMB base station grid eliminates the problem of poor link quality at the cell edge that is inherent in cellular network system and enables high-quality equal grade of service (EGOS) regardless of the location of a mobile station.

In order to utilize the fact that MS can detect signal from multiple MMB base stations in a MMB network, a cloud cell is formed around the MS. A cloud cell is a virtual cell consisting of multiple BSs that serve a single MS. The MMB BSs in a cloud cell communicating with the MS need to perform downlink (DL) Tx Beamforming, while the MS may need to perform DL Rx Beamforming to receive DL control and data. A MS communicating with a MMB BS in the cloud cell may need to perform uplink (UL) Tx Beamforming while the MMB BS may need to perform UL Rx Beamforming to transmit UL data.

In the traditional communication system wherein a MS communicates with single BS, BS receives Internet Protocol (IP) packets from a data gateway in DL direction, performs entire processing of IP packets, and transmits physical bursts carrying the processed IP packets to the MS. In UL direction, the BS receives physical bursts carrying IP packets from the MS, performs entire processing of the received physical burst and transmits the IP packets to the data gateway.

Typically, in order to secure the IP packets, the BS encrypts the IP packets received from the data gateway prior to transmitting to the MS. Similarly, the BS decrypts the IP packets received from the MS before transmitting to the data gateway. An authentication/authorization key (AK) is generated for an <MS, BS> pair. The AK is generated by key distribution function in the network and provided to a BS. MS also generates the AK. Independent security keys are then generated from the AK for control and data packets. <MS, BS> uses these generated security keys for control and data to apply security to control and data packets respectively. Authorization/Authentication key (AK) is updated when the MS performs handover from one BS to another.

The procedure and interaction between various entities to generate security keys is given below. At first, the MS registers with the BS and MS context (capability) is initialized with the authenticator. The MS is then authenticated with an AAA server using Extensible Authentication Procedure (EAP) procedures. As part of EAP procedure, Master Session Key (MSK) is established at the MS and an Authentication, Authorization and Accounting (AAA) server. The AAA server then transfers the MSK to the authenticator. Thereafter, the authenticator and the MS derive a Pair Wise Master Key (PMK) from the MSK. Then, the authenticator and the MS derive an authentication key specific to the BS from the PMK. The authenticator transfers the derived authentication to the BS. The BS and the MS derives security keys for data and control packets from the authentication key. In this procedure, the MSK is known to the MS, the authenticator and the AAA server. The MS receives the MSK from the AAA server during the EAP procedure. Also, the authenticator receives the MSK from the AAA server. The PMK is known to the MS and the authenticator. The PMK is derived by the MS and the authenticator from the MSK. The AK is known to the MS, the BS and the authenticator. The MS and the authenticator derive AK from the PMK. The BS receives the AK from the authenticator.

In another wireless communication system such as Long Term Evolution (LTE), where MS communicates with single BS, security processing for data packets is performed by MS and BS. However, control packets are divided in two categories, category 1 consists of control packets terminating at BS and category 2 consists of control packets terminating at Mobility Management Entity (MME). Security processing of control packets terminating at BS is done by MS and BS. Security processing of control packets terminating at MME is done by MS and MME.

In the mobile broadband system, where the multiple BSs are grouped together to serve a single MS and the MS communicates with multiple BSs in the cloud cell, several methods are proposed for security. In one method, each BS in a cloud cell is capable of applying security function on IP packets. Each BS applies security to IP packets received from the data gateway or the Master BS before transmitting to the MS. Each BS also applies security to the IP packets received from the MS before transmitting to the data gateway or the Master BS. However, this scheme requires either sharing of security keys to all BSs in the cloud cell or maintaining independent security keys for each BS. The sharing of security keys across the BSs in the cloud cell or maintaining independent security keys for each BS requires frequent update of the security keys due to addition or deletion of the BS(s) in the cloud cell. The BS(s) may be added and deleted frequently because of the small coverage area of each BS in the mobile broadband system.

In a mobile broadband system with gigabit throughput, in order to facilitate faster processing it is necessary that packets are already encrypted before resources for transmitting packets are allocated to MS by BS. The frequent key update may result in discarding of already encrypted packets at the MS. The MS also needs to maintain both encrypted and unencrypted packets in order to re-encrypt the packets after the security keys are updated. Independent security key for each BS may also require the MS to maintain multiple security keys which is not desirable to reduce the MS complexity.

In another scheme, only master BS may be allowed to apply security to packets received from the data gateway and the MS. This may also lead to frequent key update because of change of master BS. This also introduces an additional hop for the IP packets going through the BS other than master BS.

SUMMARY OF INVENTION

Aspects of the present invention are to address at least the above-mentioned problems and/or disadvantages and to provide at least the advantages described below. Accordingly, an aspect of the present invention is to provide a method and an apparatus for securing control packets and data packets in a mobile broadband network environment.

In accordance with an aspect of the present invention, a method for secured communication of data packets in a mobile broadband network environment is provided. The method comprises receiving one or more data packets intended for a mobile station from a packet data network by a data gateway, encrypting the one or more data packets using one or more security keys established at the data gateway for secured communication with the mobile station, and transmitting the encrypted one or more data packets to the mobile station via one or more base stations.

The drawings described herein are for illustration purposes only and are not intended to limit the scope of the present disclosure in any way.

DETAILED DESCRIPTION OF EXEMPLARY EMBODIMENTS

The present invention provides a method and an apparatus for securing data packets and control messages in a mobile broadband network environment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The terms 'control packets' and 'control messages' are interchangeably used throughout the document.

Figure 1:
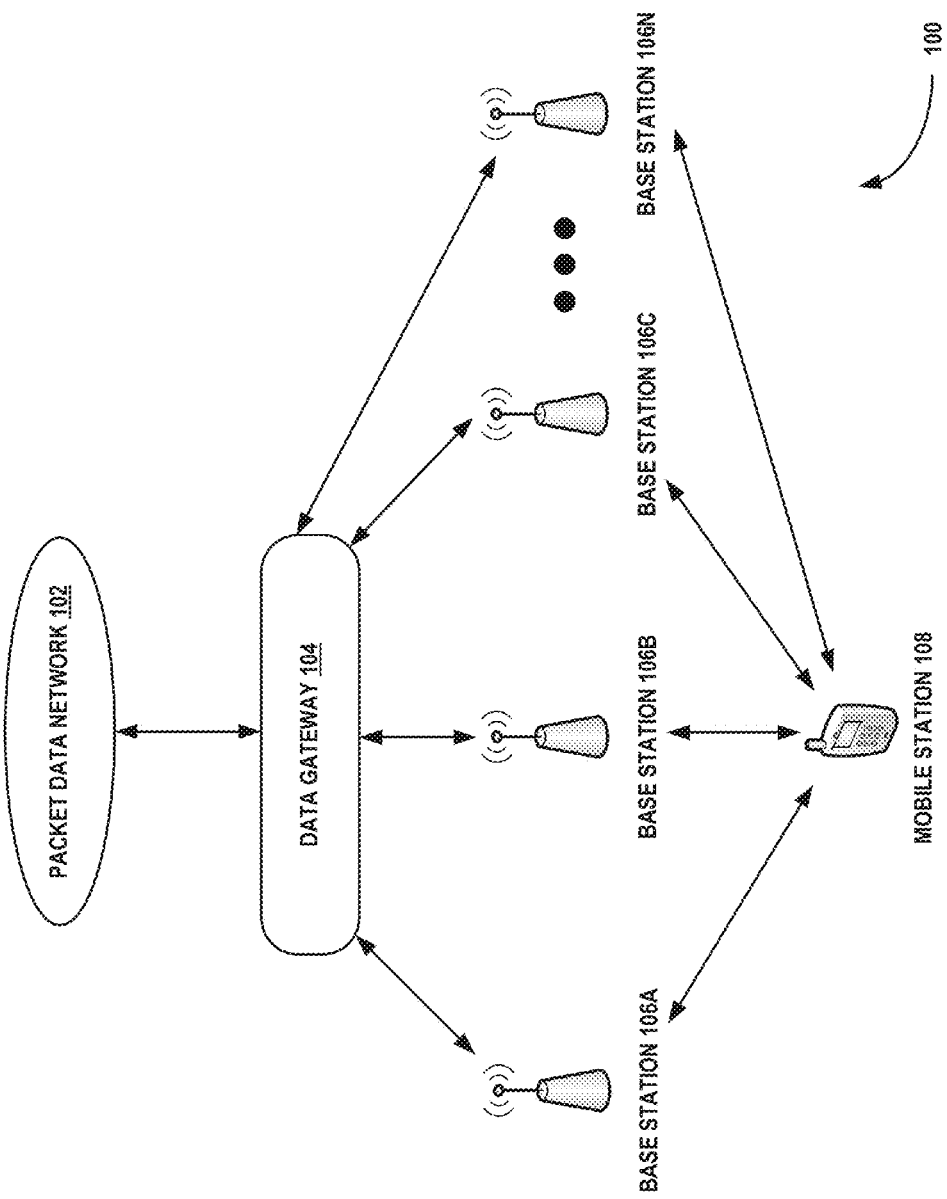
FIG. 1 is a schematic representation illustrating a mobile broadband network environment, in the context of the invention.

FIG. 1 is a schematic representation illustrating a mobile broadband network environment 100, in the context of the invention. Referring to FIG. 1, the mobile broadband network environment 100 includes a packet data network 102, a data gateway 104, base stations 106A-N and a mobile station 108. In the mobile broadband network environment 100, the base stations 106A-N serving the mobile station 108 are connected to the data gateway 104 and configured for receiving data packets from the data gateway 104 and transmitting data packets to the data gateway 104. Alternatively, the base stations 106A-N serving the mobile station 108 are connected to the data gateway 104 while a master base station (e.g., the base station 106A) is configured for receiving/transmitting data packets for the mobile station 108 from/to the data gateway 104. In some embodiments, the base stations 106A-N may be physically connected to the data gateway 104. In other embodiments, the base stations 106A-N may be logically connected to the data gateway 104 via other base stations or network nodes.

The data gateway 104 is an entity through which data packets transmitted to the mobile station 108 in downlink direction and data packets received from the mobile station 108 in uplink direction are routed. The data gateway 104 may be also known as access gateway or packet gateway in the art. The mobile station 108 may be a mobile phone capable of receiving and transmitting data packets/control messages from the data gateway 104/base stations 106A-N.

Figure 2:
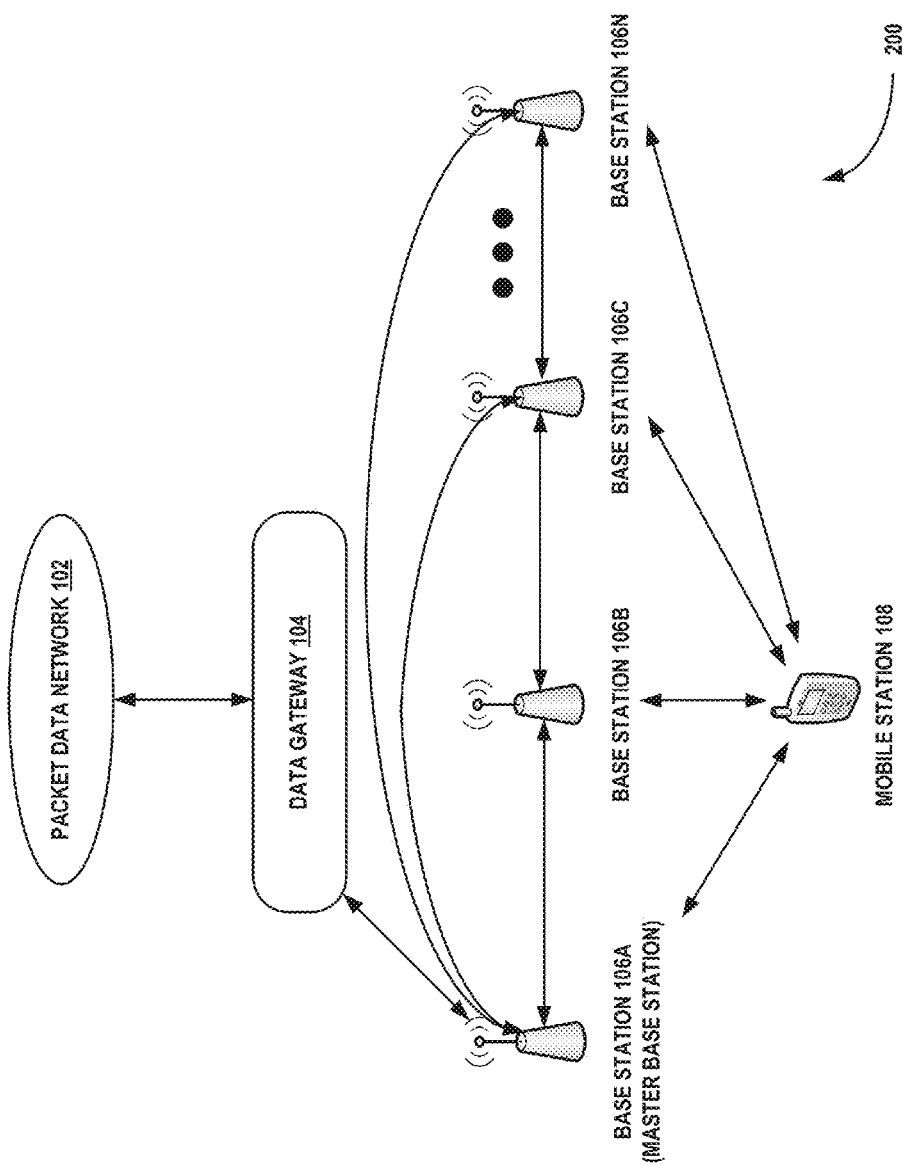
FIG. 2 is a schematic representation illustrating another mobile broadband network environment, in the context of the invention.

FIG. 2 is a schematic representation illustrating another mobile broadband network environment 200, in the context of the invention. It can be seen that the mobile broadband network environment 200 is similar to the mobile broadband network environment 100 of FIG. 1, except that the master base station 106A amongst the plurality of base stations 106A-N serving the mobile station 108 can receive/transmit data packets for the mobile station 108 from/to data gateway 104. It can be noted that, the master base station 106A may be physically connected to the data gateway 104 or logically connected to the data gateway 104 via other base stations or network nodes.

According to the present invention, the mobile station 108 and the data gateway 104 are peers for securing data packets. That is, security context for data packets is maintained at the mobile station 108 and the data gateway 104. Further, security processing for data packets is performed by the mobile station 108 and the data gateway 104. Since, the data gateway 104 is peer for securing data packets, one or more data security keys for securing data packets is not required to be updated till the mobile station 108 moves away from the base stations 106A-N to another base station(s) which is not connected to the data gateway 104. Further, the mobile station 108 and the base stations 106A-N are peers for securing control messages. That is, security context for control messages is maintained at the mobile station 108 and the base stations 106A-N. Further, security processing for control messages is performed by the mobile station 108 and the base stations 106A-N.

Figure 3A:
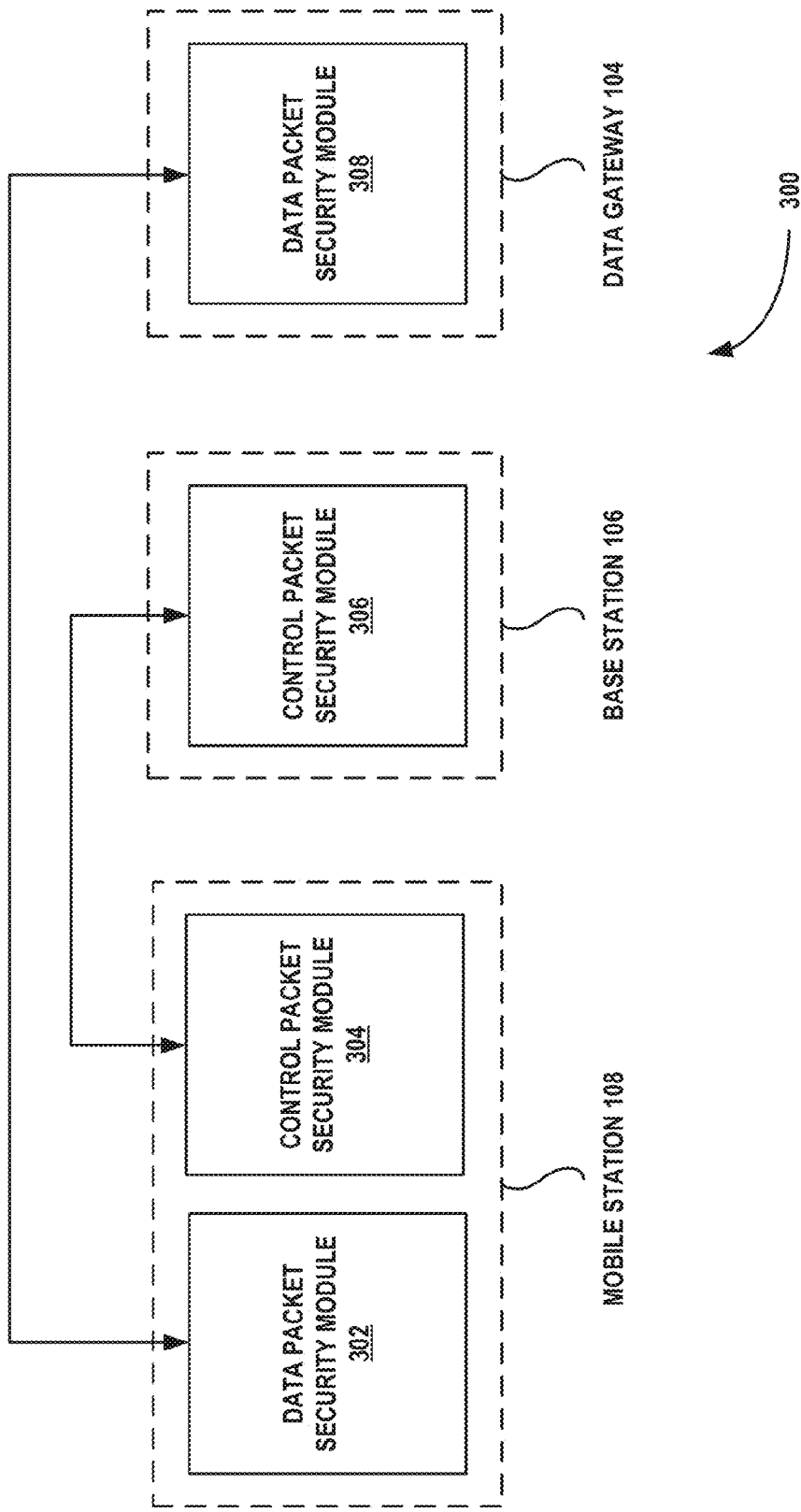
FIG. 3A illustrates a block diagram of various entities of a wireless network system involved in secured communication of data packets/control messages, according to one embodiment.

FIG. 3A illustrates a block diagram 300 of various entities of a wireless network system involved in secured communication of data packets/control messages, according to one embodiment. The various entities involved in secured communication of data packets include the mobile station 108 and the data gateway 104. Similarly, the various entities involved in secured communication of control messages include the mobile station 108 and the base station 106.

Referring to FIG. 3A, the mobile station 108 includes a data packet security module 302 and a control packet security module 304. The data packet security module 302 is configured for generating a data authentication/authorization key (AKdata) using an identifier of the mobile station 108, an identifier of the data gateway 104, and one of pair wise master key (PMK) and master session key (MSK). In one exemplary implementation, the identifier of the data gateway 104 is received by the mobile station 108 from the mobile broadband network. The PMK is generated from the MSK, where the MSK is established between the mobile station 108 and an Authentication, Authorization and Accounting (AAA) server during an authentication procedure. The authentication procedure is generally performed when the mobile station 108 registers with the mobile broadband network. Alternatively, the authentication procedure may be performed upon expiry of life time of the master session key. In an exemplary implementation, few bits of the MSK are truncated to generate the PMK.

Further, the data packet security module 302 is configured for generating one or more data security keys using the data authorization/authentication key. Alternatively, the data packet security module 302 is configured for generating one or more data security keys using the identifier of the mobile station 108, the identifier of the data gateway 104, and one of the PMK and the MSK established or derived at the mobile station 108 during the authentication procedure.

Furthermore, the data packet security module 302 is configured for encrypting data packets and decrypting encrypted data packets using the one or more generated data security keys. In one exemplary implementation, the data packet security module 302 encrypts/decrypts data packets by applying privacy protection to the data packets using the one or more data security keys. In another exemplary implementation, the data packet security module 302 encrypts/decrypts data packets by applying integrity protection to the data packets using the one or more data security keys. In yet another exemplary implementation, the data packet security module 302 encrypts/decrypts data packets by applying privacy protection to the data packets and integrity protection to the data packets using the one or more data security keys.

The control packet security module 304 is configured for generating a control authentication/authorization key (AKcontrol) for generating one or more control security keys. In one embodiment, the control packet security module 304 is configured for generating the control authentication/authorization key using an identifier of the mobile station 108, an identifier of the master base station 106A, and one of the PMK and the MSK. In another embodiment, the control packet security module 304 is configured for generating the control authentication/authorization key using an identifier of the mobile station 108, an identifier of the cloud cell to which the mobile station 108 belongs, and one of the PMK and the MSK. In yet another embodiment, the control packet security module 304 is configured for generating the control authentication/authorization key using an identifier of the mobile station 108, an identifier of respective base station in the cloud cell associated with the mobile station 108, and one of the PMK and the MSK. In further another embodiment, the control packet security module 304 is configured for generating the control authentication/authorization key using an identifier of the mobile station 108, a random seed in the cloud cell associated with the mobile station 108, and one of the PMK and the MSK.

Further, the control packet security module 304 is configured for generating one or more control security keys using the control authentication/authorization key. Furthermore, the control packet security module 304 is configured for encrypting control messages and decrypting encrypted control messages using the one or more control security keys. In one exemplary implementation, the control packet security module 304 encrypts/decrypts control message by applying privacy protection to the control message using the one or more control security keys. In another exemplary implementation, the control packet security module 304 encrypts/decrypts control message by applying integrity protection to the control message using the control security keys. In yet another exemplary implementation, the control packet security module 304 encrypts/decrypts control message by applying privacy protection to the control message and integrity protection to the control message using the control security keys.

The hierarchy of keys generated at the mobile station by the data packet security module 302 and the control packet security module 304 is illustrated in FIGS. 12A-12D.

The base station 106 includes a control packet security module 306. The control packet security module 306 is configured for generating a control authentication/authorization key for generating one or more control security keys. In one embodiment, the control packet security module 306 is configured for generating the control authentication/authorization key using an identifier of the mobile station 108, an identifier of the master base station 106A, and one of the PMK and the MSK. In another embodiment, the control packet security module 304 is configured for generating the control authentication/authorization key using an identifier of the mobile station 108, an identifier of the cloud cell to which the mobile station 108 belongs, and one of the PMK and the MSK. In yet another embodiment, the control packet security module 304 is configured for generating the control authentication/authorization key using an identifier of the mobile station 108, an identifier of respective base station in the cloud cell associated with the mobile station 108, and one of the PMK and the MSK. Alternatively, the control authentication key is directly received from the authenticator for generating one or more control security keys. Further, the control packet security module 306 is configured for generating one or more control security keys using the control authentication/authorization key.

Furthermore, the control packet security module 306 is configured for encrypting control messages and decrypting encrypted control messages using the one or more generated control security keys. In one exemplary implementation, the control packet security module 306 encrypts/decrypts control messages by applying privacy protection to the control message using the one or more control security keys. In another exemplary implementation, the control packet security module 306 encrypts/decrypts control messages by applying integrity protection to the control message using the one or more control security keys. In yet another exemplary implementation, the control packet security module 306 encrypts/decrypts control message by applying privacy protection to the control messages and integrity protection to the control messages using the one or more control security keys.

The data gateway 104 includes a data packet security module 308. The data packet security module 308 is configured for receiving one of the PMK and the MSK from an authenticator (e.g., AAA server) and generating a data authentication/authorization key using an identifier of the mobile station 108, an identifier of the data gateway 104, and the one of the PMK and the MSK. Alternatively, the data authentication/authorization key is received from the authenticator. Further, the data packet security module 308 is configured for generating one or more data security keys using the data authentication/authorization key. Alternatively, the data packet security module 308 is configured for receiving one of pair wise master key and master session key from an authenticator (e.g., AAA server) and generating one or more data security keys using the identifier of the mobile station 108, the identifier of the data gateway 104, and the one of the PMK and the MSK. In some embodiments, the one or more data security keys may be directly received from the authenticator.

Furthermore, the data packet security module 308 is configured for encrypting data packets received from the packet data network 102 and decrypting the encrypted data packets received from the mobile station 108 using the one or more data security keys. In one exemplary implementation, the data packet security module 308 encrypts/decrypts data packets by applying privacy protection to the data packets using the one or more data security keys. In another exemplary implementation, the data packet security module 308 encrypts/decrypts data packets by applying integrity protection to the data packets using the one or more data security keys. In yet another exemplary implementation, the data packet security module 308 encrypts/decrypts data packets by applying privacy protection to the data packets and integrity protection to the data packets using the one or more data security keys.

Figure 3B:
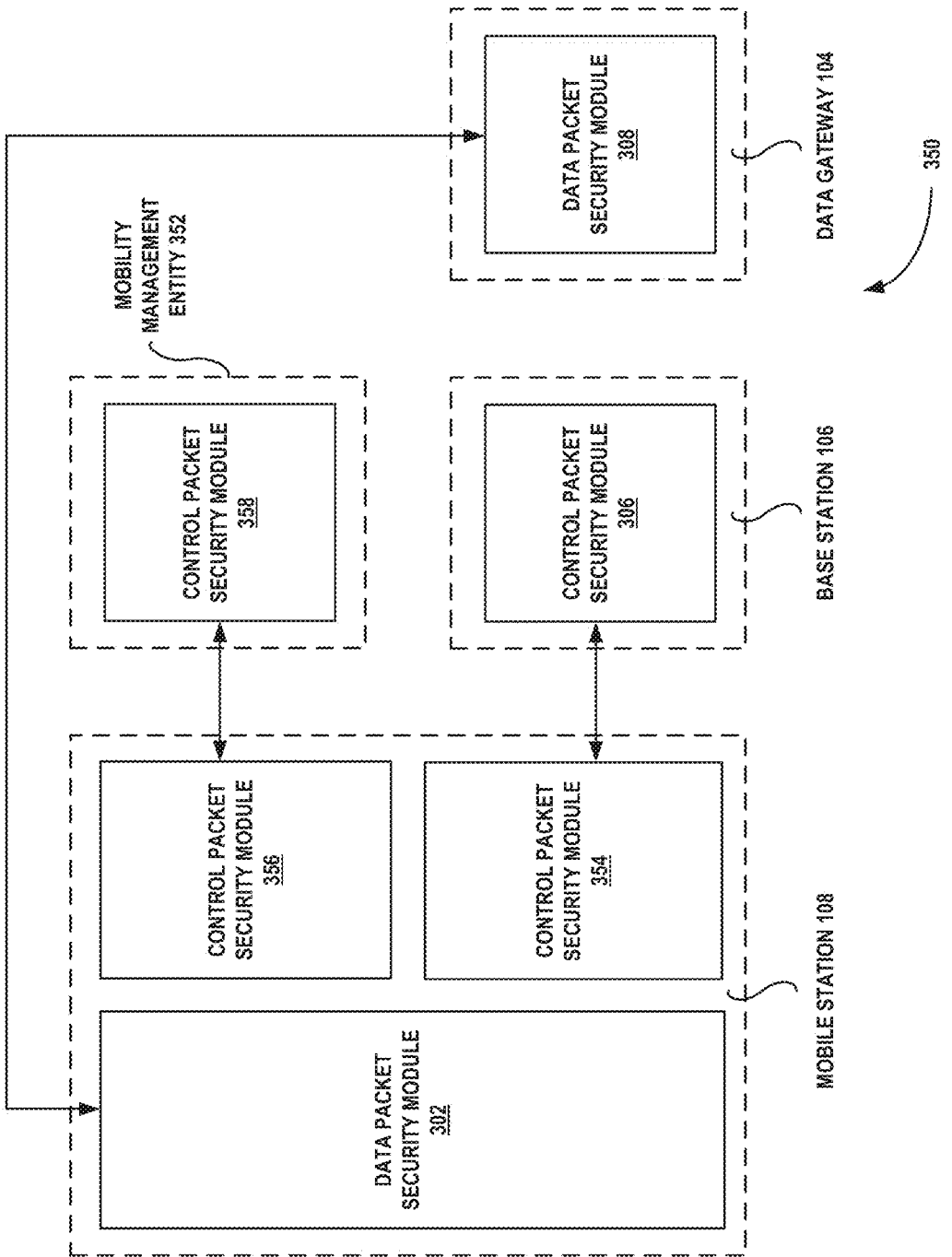
FIG. 3B illustrates a block diagram of various entities of a wireless network system involved in secured communication of data packets/control messages, according to another embodiment.

FIG. 3B illustrates a block diagram 350 of various entities of a wireless network system involved in secured communication of data packets/control messages, according to another embodiment. It can be seen that the block diagram 350 is same as the block diagram 300 of FIG. 3A, except the entities involved in secured communication of control messages. The entities involved in secured communication of control messages include the mobile station 108, the base station 106, the data gateway 104, and a mobility management entity 352. The mobile station 108 includes a control packet security module 354 and a control packet security module 356. The control packet security module 354 is configured for encrypting/decrypting control messages intended for the base station 106 using first set of control security keys. The first set of control security keys are generated by the control packet security module 354 or received from the authenticator. The control packet security module 356 is configured for encrypting/decrypting control messages intended for the mobility management entity 352 using a second set of control security keys. The second set of security keys are generated by the control packet security module 356 or received from the authenticator.

The mobility management module 352 includes a control packet security module 358. The control packet security module 358 is configured for encrypting control messages intended for the mobile station 108 and decrypting control messages received from the mobile station 108 using a second set of security keys established at the mobility management entity 352.

One skilled in the art will understand that, the mobile station 108 and the data gateway 104 can continue to use data security keys derived from data authentication keys even if the mobile station 108 performs handover from one base station to another or a base station is added or deleted from a cloud cell due to mobility of the mobile station 108.

One skilled in the art will also understand that, if the control authentication key is generated based on a cloud seed (i.e., identifier of a cloud cell), then a new control authentication key is to be generated when a new base station is added to the cloud cell or the existing base station deleted from the cloud cell.

If the control authentication key is generated based on identifier of a master base station, then the control authentication key is to be updated when the master base station is changed. If the control authentication key is generated based on identifier of a base station, then a new control authentication key and associated control security keys is to be derived for a new base station added in the cloud cell. Similarly, if the control authentication key is generated based on identifier of a base station then the control authentication key and associated control security keys is to be deleted for a base station deleted from the cloud cell.

Figure 4A:
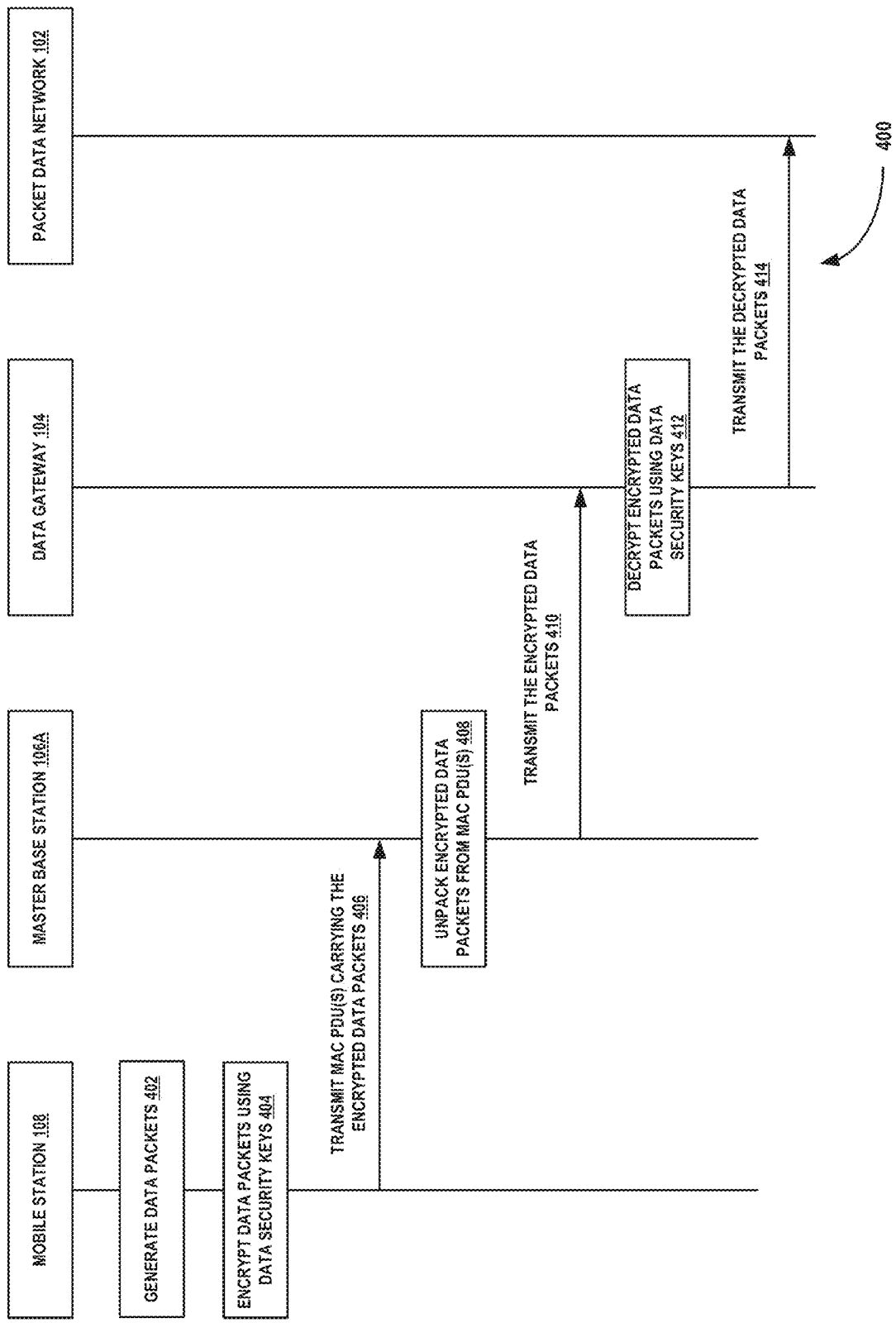
FIG. 4A is a flow diagram illustrating an exemplary method of securely communicating data packets from a mobile station to a data gateway, according to one embodiment.

FIG. 4A is a flow diagram 400 illustrating an exemplary method of securely communicating data packets from the mobile station 108 to the data gateway 104, according to one embodiment. When the mobile station 108 wishes to transmit data to the packet data network 102, the mobile station 108 generates data packets 402 carrying the data, at step 402.

At step 404, the mobile station 108 encrypts the data packets using one or more data security keys established at the mobile station 108. At step 406, the mobile station 108 transmits MAC PDU(s) carrying the encrypted data packets to the master base station 106A. In one embodiment, the MAC PDU(s) carries unfragmented data packets. In another embodiment, the MAC PDU(s) carries fragmented data packets.

At step 408, the master base station 106A unpacks the encrypted data packets from the received MAC PDU(s). At step 410, the master base station 106A transmits the unfragmented encrypted data packets to the data gateway 104. At step 412, the data gateway 104 decrypts the encrypted data packets using one or more data security keys established at the data gateway 104. At step 414, the data gateway 104 transmits the decrypted data packets to the packet data network 102 for further processing.

Figure 4B:
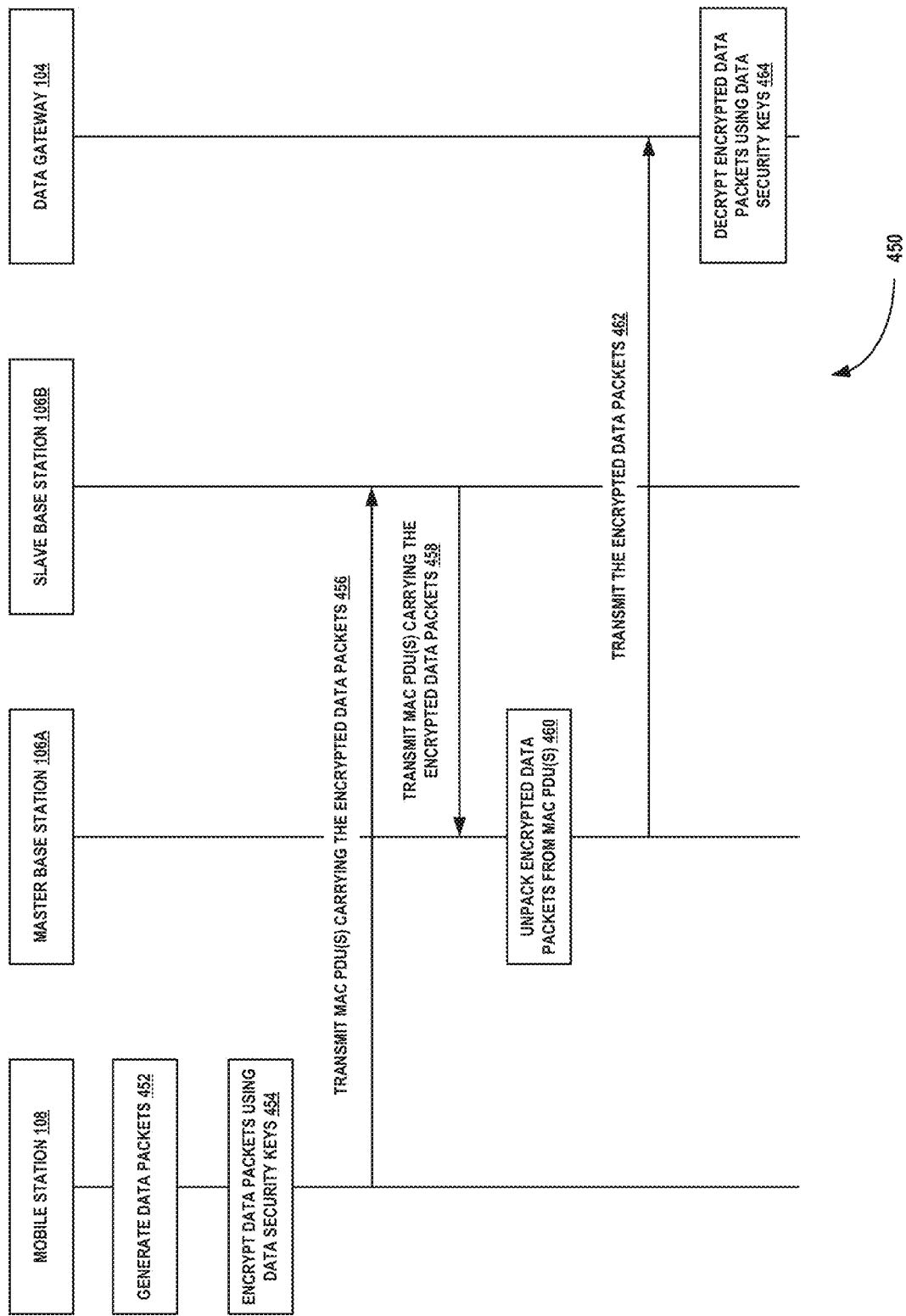
FIG. 4B is a flow diagram illustrating an exemplary method of securely communicating data packets from the mobile station to the data gateway, according to another embodiment.

FIG. 4B is a flow diagram 450 illustrating an exemplary method of securely communicating data packets from the mobile station 108 to the data gateway 104, according to another embodiment. At step 452, the mobile station 108 generates data packets carrying data to be transmitted to the packet data network 102. At step 454, the mobile station 108 encrypts the data packets using one or more data security keys established at the mobile station 108. At step 456, the mobile station 108 transmits MAC PDU(s) carrying the encrypted data packets to the slave base station 106B. In one embodiment, the MAC PDU(s) carries unfragmented data packets. In another embodiment, the MAC PDU(s) carries fragmented data packets. At step 458, the slave base station 106B transmits the MAC PDU(s) carrying the encrypted data packets to the master base station 106A.

At step 460, the master base station 106A unpacks the encrypted data packets from the received MAC PDU(s). At step 462, the master base station 106A transmits the unfragmented encrypted data packets to the data gateway 104. At step 464, the data gateway 104 decrypts the encrypted data packets using one or more data security keys established at the data gateway 104 for transmitting the decrypted data packets to the packet data network 102 for further processing.

Figure 4C:
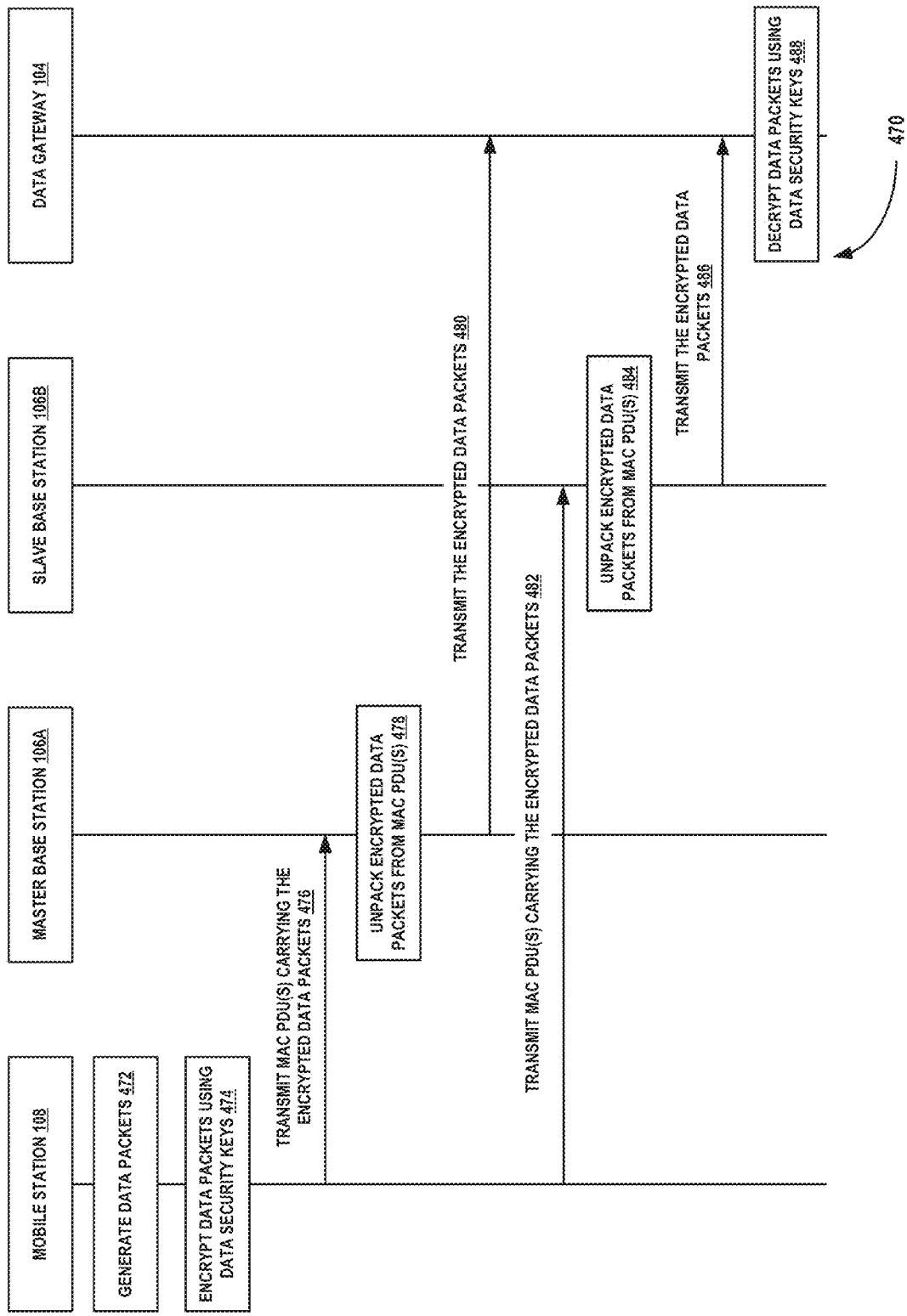
FIG. 4C is a flow diagram illustrating an exemplary method of securely communicating data packets from the mobile station to the data gateway, according to yet another embodiment.

FIG. 4C is a flow diagram 470 illustrating an exemplary method of securely communicating data packets from the mobile station 108 to the data gateway 104, according to yet another embodiment. At step 472, the mobile station 108 generates data packets carrying data for the packet data network 102. At step 474, the mobile station 108 encrypts the data packets using one or more data security keys established at the mobile station 108.

At step 476, the mobile station 108 transmits MAC PDU(s) carrying the encrypted data packets to the master base station 106A. In one embodiment, the MAC PDU(s) carries unfragmented data packets. In another embodiment, the MAC PDU(s) carries fragmented data packets. At step 478, the master base station 106A unpacks the encrypted data packets from the received MAC PDU(s). At step 480, the master base station 106A transmits the unfragmented encrypted data packets to the data gateway 104.

Substantially simultaneously, at step 482, the mobile station 108 transmits MAC PDU(s) carrying the encrypted data packets to the slave base station 106B. At step 484, the slave base station 106B unpacks the encrypted data packets from the received MAC PDU(s). At step 486, the slave base station 106B transmits the unfragmented encrypted data packets to the data gateway 104. At step 488, the data gateway 104 decrypts the encrypted data packets received from the master base station 106A and/or the slave base station 106B using one or more data security keys established at the data gateway 104.

Figure 5A:
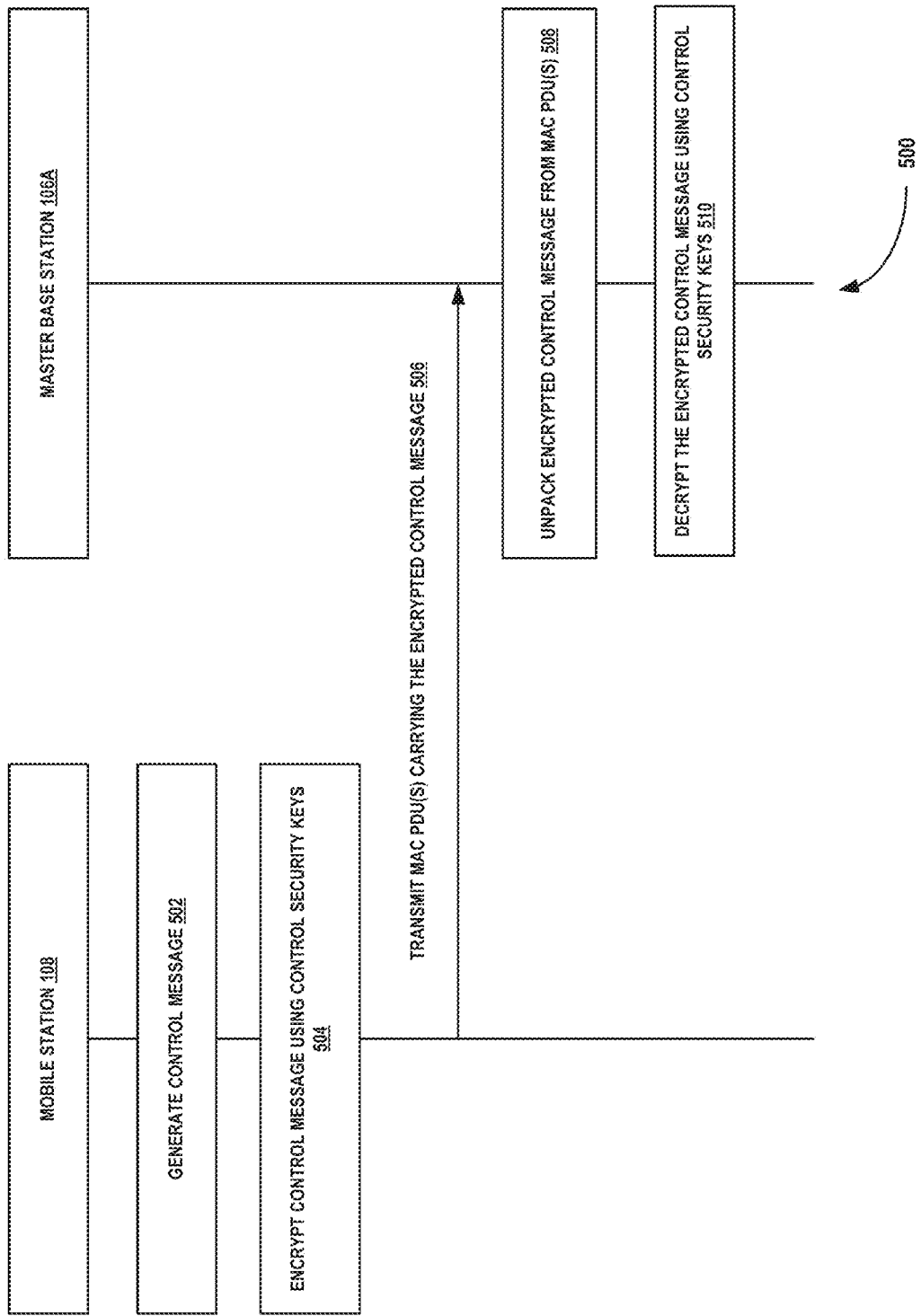
FIG. 5A is a flow diagram illustrating an exemplary method of securely communicating control packets from the mobile station to a master base station, according to one embodiment.

FIG. 5A is a flow diagram 500 illustrating an exemplary method of securely communicating control packets from the mobile station 108 to the master base station 106A, according to one embodiment. When the mobile station 108 wishes to securely transmit control information to the master mobile station 106A, the mobile station 108 generates a control message containing control information, at step 502. At step 504, the mobile station 108 encrypts the control message using one or more control security keys established at the mobile station 108 for secured communication of control messages.

At step 506, the mobile station 108 transmits MAC PDU(s) carrying the encrypted control message to the master base station 106A. In one embodiment, the MAC PDU(s) carries unfragmented control message. In another embodiment, the MAC PDU(s) carries fragmented control message. At step 508, the master base station 106A unpacks the encrypted control message from the MAC PDU(s). At step 510, the master base station 106A decrypts the encrypted control message using one or more control security keys established at the master base station 106A.

Figure 5B:
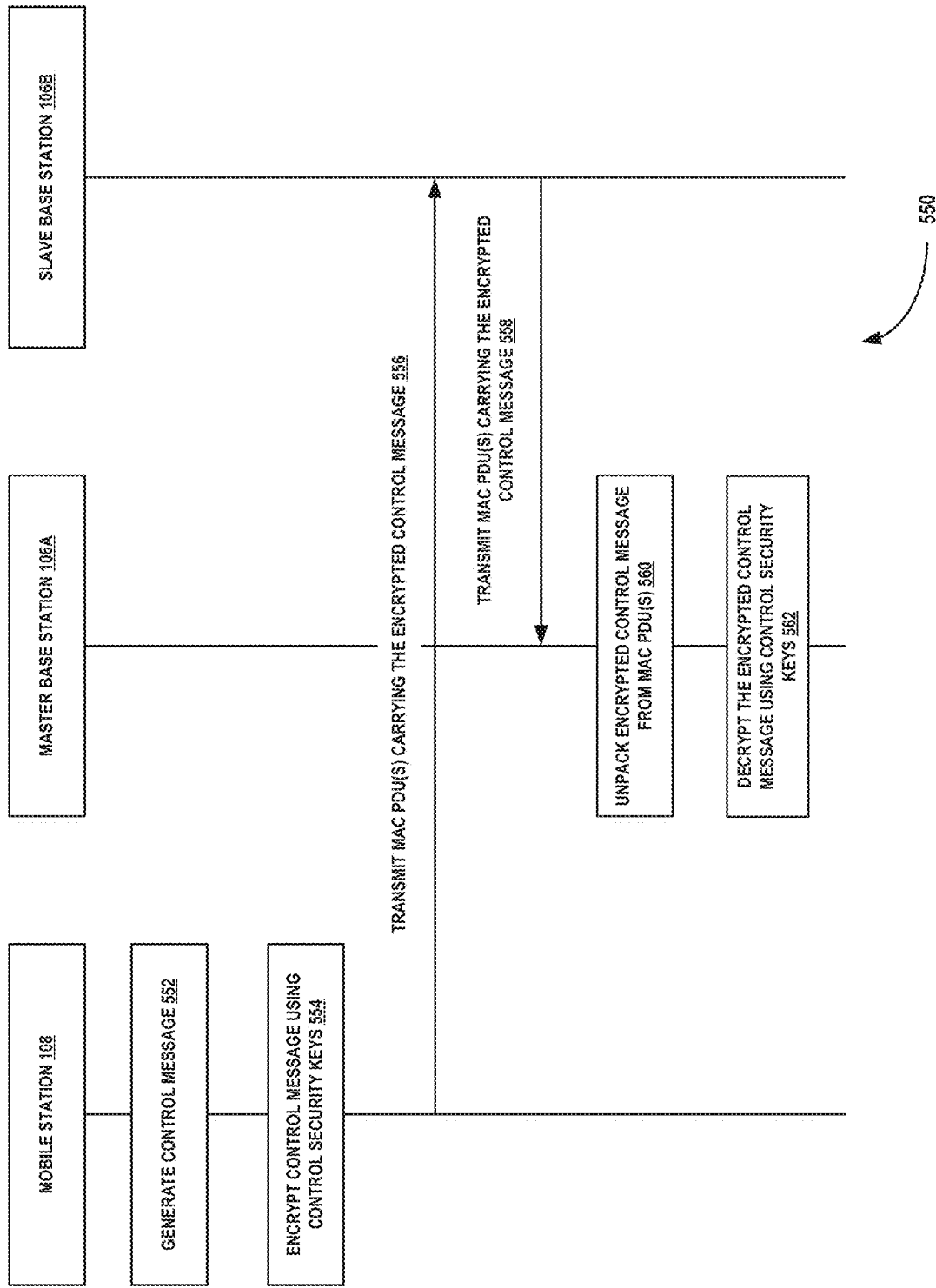
FIG. 5B is a flow diagram illustrating an exemplary method of securely communicating control packets from the mobile station to the master base station, according to another embodiment.

FIG. 5B is a flow diagram 550 illustrating an exemplary method of securely communicating control packets from the mobile station 108 to the master base station 106A, according to another embodiment. At step 552, the mobile station 108 generates a control message containing control information. At step 554, the mobile station 108 encrypts the control message using one or more control security keys established at the mobile station 108 for secured communication of control messages.

At step 556, the mobile station 108 transmits MAC PDU(s) carrying the encrypted control message to the slave base station 106B. In one embodiment, the MAC PDU(s) carries unfragmented control message. In another embodiment, the MAC PDU(s) carries fragmented control message. At step 558, the slave base station 106B transmits the MAC PDU(s) carrying the encrypted control message to the master base station 106A. At step 560, the master base station 106A unpacks the encrypted control message from the MAC PDU(s). At step 562, the master base station 106A decrypts the encrypted control message using one or more control security keys established at the master base station 106A.

Figure 5C:
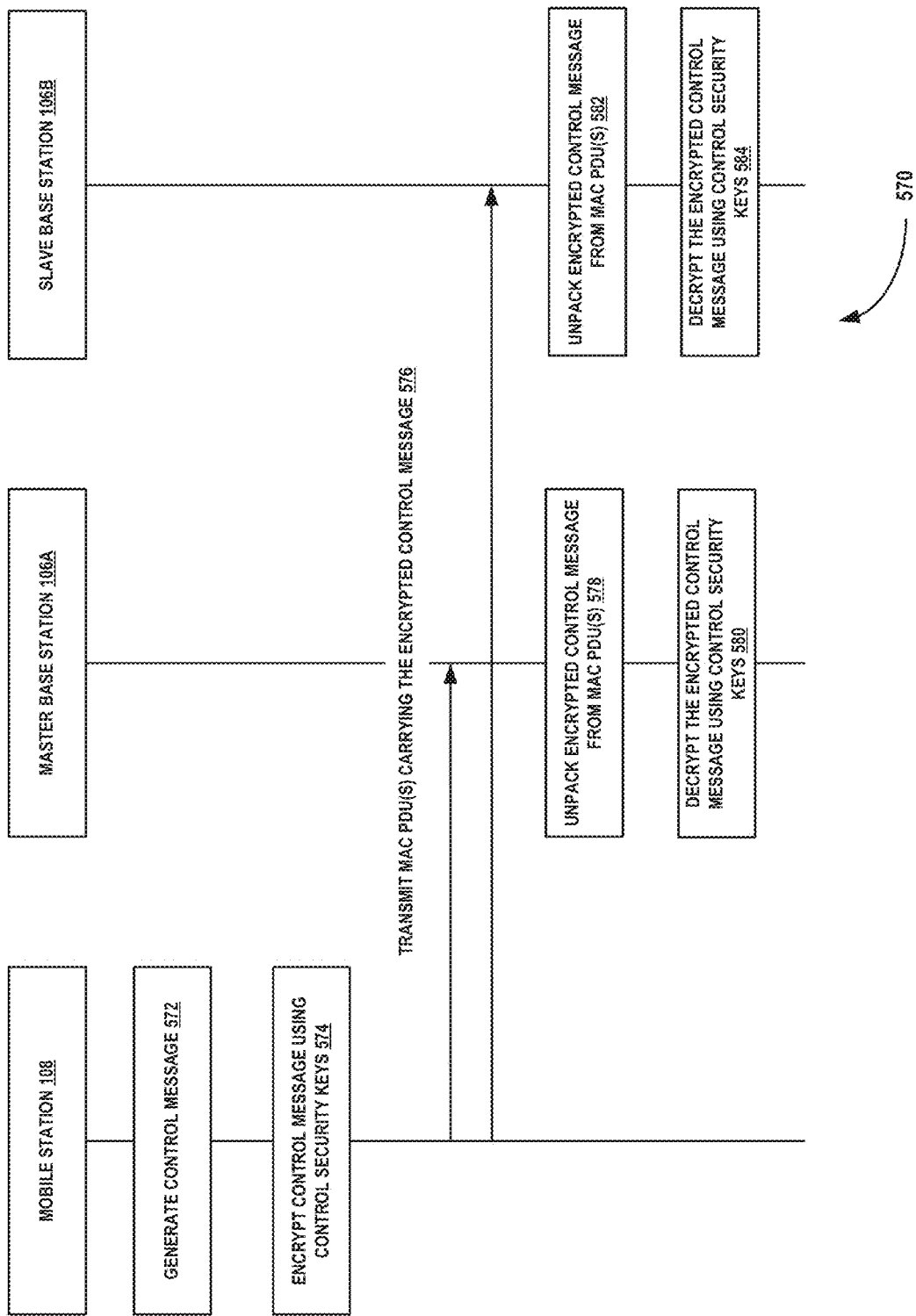
FIG. 5C is a flow diagram illustrating an exemplary method of securely communicating control packets from the mobile station to the master base station and a slave base station, according to yet another embodiment.

FIG. 5C is a flow diagram 570 illustrating an exemplary method of securely communicating control packets from the mobile station 108 to the master base station 106A and the slave base station 106B, according to yet another embodiment. At step 572, the mobile station 108 generates a control message containing control information. At step 574, the mobile station 108 encrypts the control message using one or more control security keys established at the mobile station 108 for secured communication of control messages.

At step 576, the mobile station 108 transmits MAC PDU(s) carrying the encrypted control message to the master base station 106A and the slave base station 106B. In one embodiment, the MAC PDU(s) carries unfragmented control message. In another embodiment, the MAC PDU(s) carries fragmented control message. At step 578, the master base station 106A unpacks the encrypted control message from the MAC PDU(s). At step 580, the master base station 106A decrypts the encrypted control message using one or more control security keys established at the master base station 106A. Similarly, at step 582, the slave base station 106B unpacks the encrypted control message from the MAC PDU(s). At step 584, the slave base station 106B decrypts the encrypted control message using one or more control security keys established at the slave base station 106B.

Figure 6A:
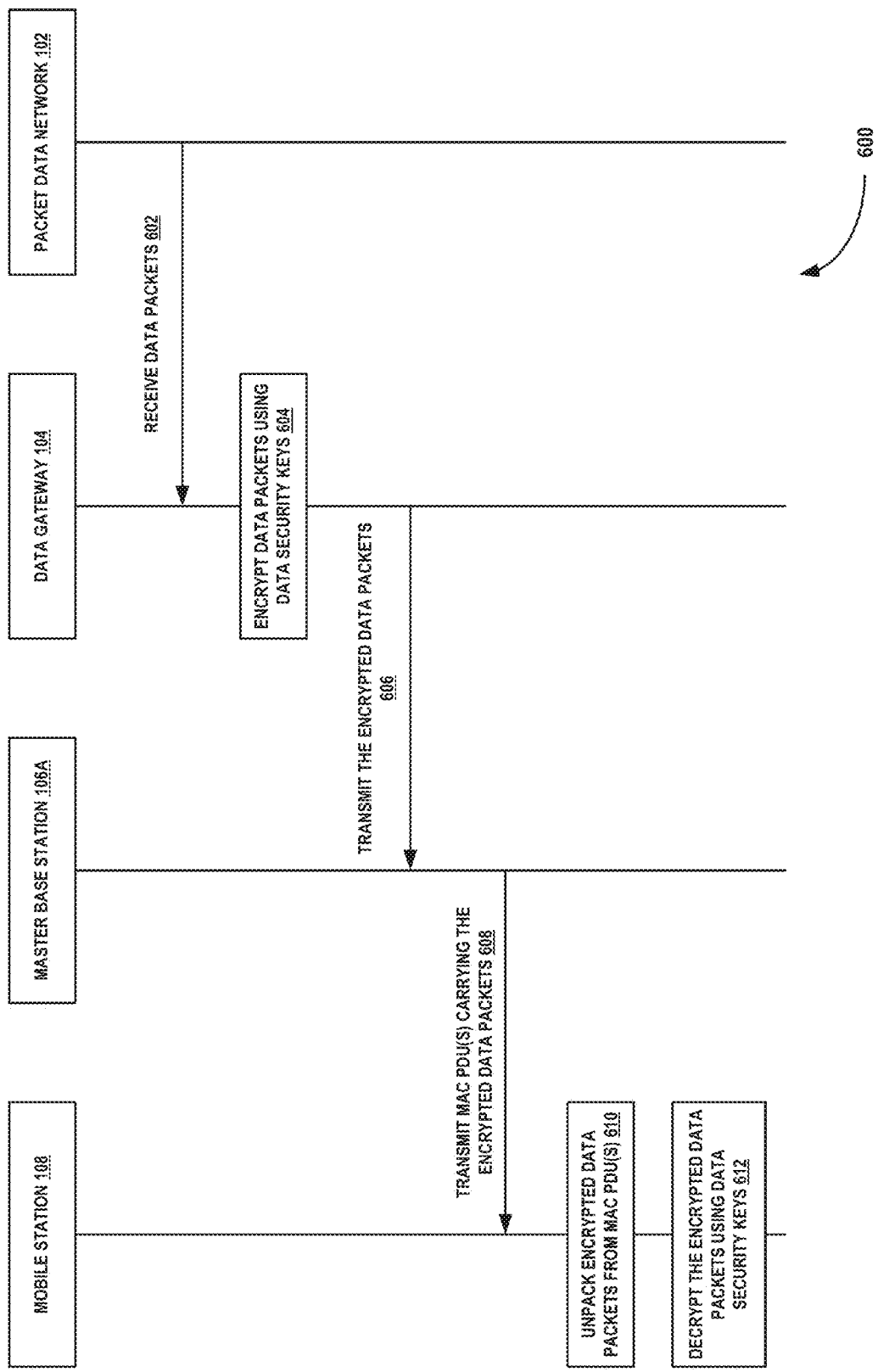
FIG. 6A is a flow diagram illustrating an exemplary method of securely communicating data packets from the data gateway to the mobile station, according to one embodiment.

FIG. 6A is a flow diagram 600 illustrating an exemplary method of securely communicating data packets from the data gateway 104 to the mobile station 108, according to one embodiment. At step 602, the data gateway 104 receives data packets intended for the mobile station 108 from the packet data network 102. At step 604, the data gateway 104 encrypts the data packets using one or more data security keys established at the data gateway 104. At step 606, the data gateway 104 transmits the unfragmented encrypted data packets to the master base station 106A.

At step 608, the master base station 106A transmits MAC PDU(s) carrying the encrypted data packets to the mobile station 108. In one embodiment, the MAC PDU(s) carries unfragmented data packets. In another embodiment, the MAC PDU(s) carries fragmented data packets. At step 610, the mobile station 108 unpacks the encrypted data packets from the received MAC PDU(s). At step 612, the mobile station 108 decrypts the encrypted data packets using one or more data security keys established at the mobile station 102.

Figure 6B:
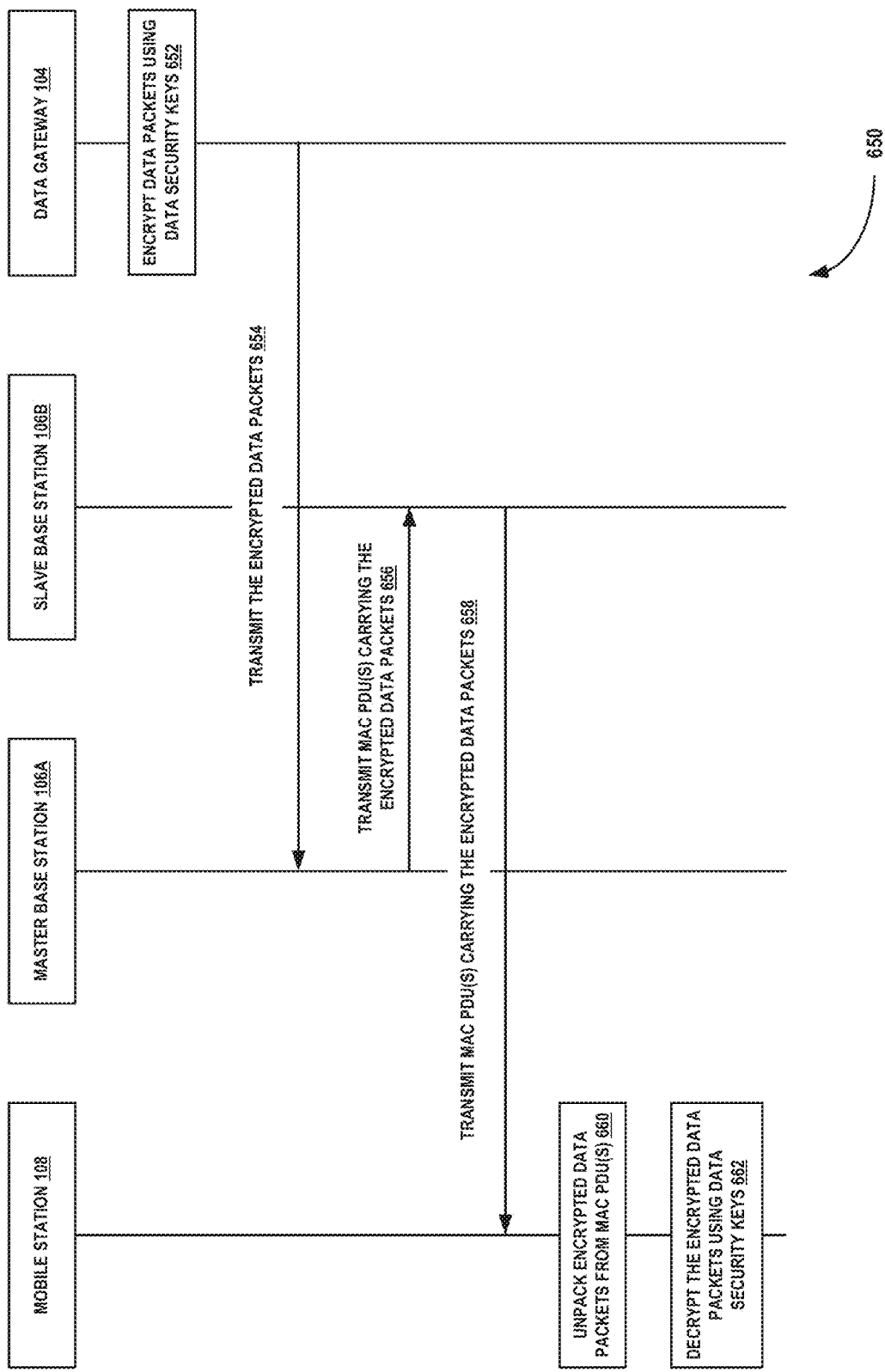
FIG. 6B is a flow diagram illustrating an exemplary method of securely communicating data packets from the data gateway to the mobile station, according to another embodiment.

FIG. 6B is a flow diagram 650 illustrating an exemplary method of securely communicating data packets from the data gateway 104 to the mobile station 108, according to another embodiment. When the data gateway 104 receives data packets intended for the mobile station 108 from the packet data network 102, at step 652, the data gateway 104 encrypts the data packets using one or more data security keys established at the data gateway 104. At step 654, the data gateway 104 transmits the unfragmented encrypted data packets to the master base station 106A.

At step 656, the master base station 106A transmits MAC PDU(s) carrying the encrypted data packets to the slave base station 106B. In one embodiment, the MAC PDU(s) carries unfragmented data packets. In another embodiment, the MAC PDU(s) carries fragmented data packets. At step 658, the slave base station 106B transmits the MAC PDU(s) carrying the encrypted data packets to the mobile station 108. At step 660, the mobile station 108 unpacks the encrypted data packets from the received MAC PDU(s). At step 662, the mobile station 108 decrypts the encrypted data packets using one or more data security keys established at the mobile station 102.

Figure 6C:
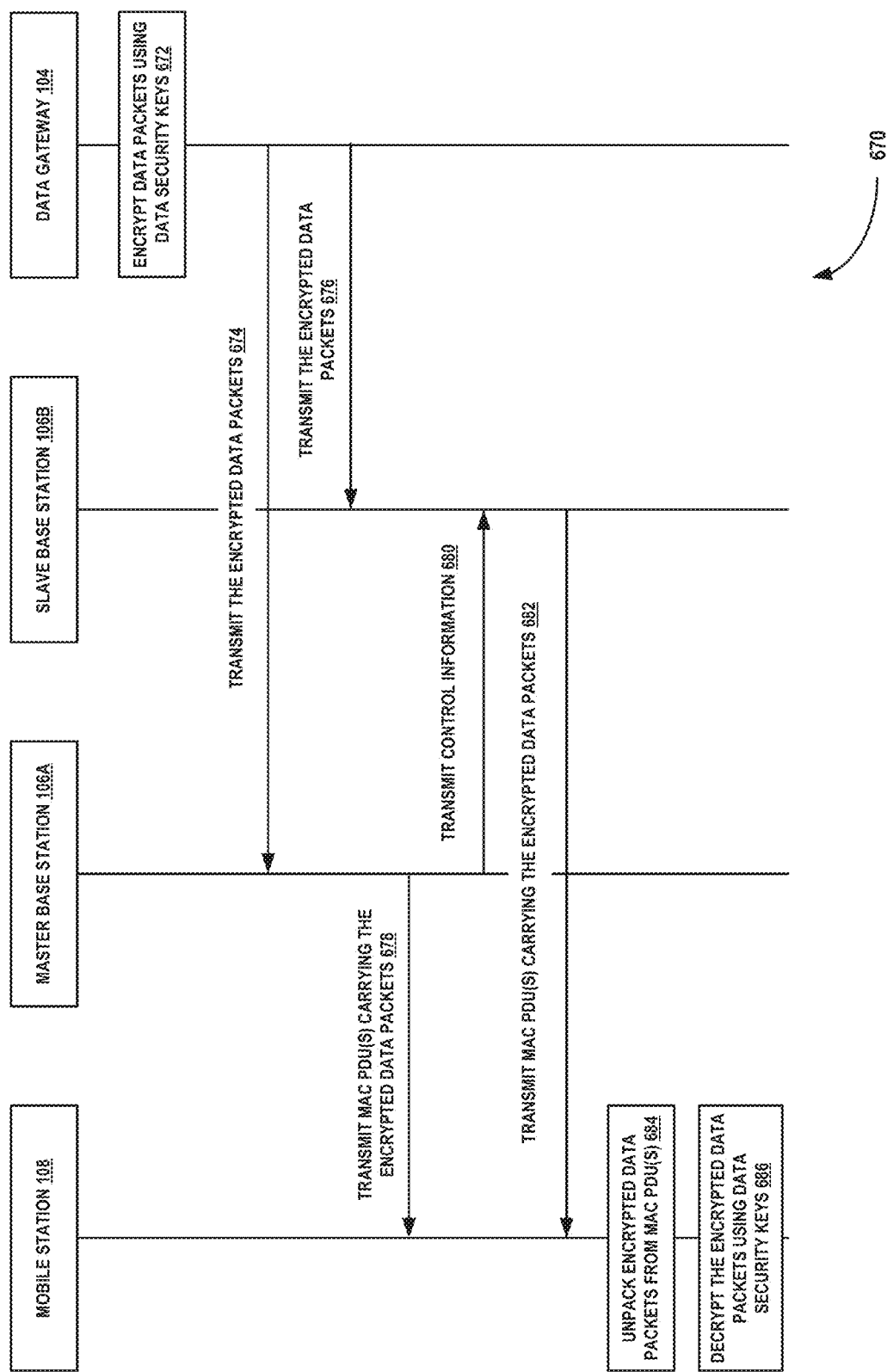
FIG. 6C is a flow diagram illustrating an exemplary method of securely communicating data packets from the data gateway to the mobile station, according to yet another embodiment.

FIG. 6C is a flow diagram 670 illustrating an exemplary method of securely communicating data packets from the data gateway 104 to the mobile station 108, according to yet another embodiment. When the data gateway 104 receives data packets intended for the mobile station 108 from the packet data network 102, at step 672, the data gateway 104 encrypts the data packets using one or more data security keys established at the data gateway 104. At step 674, the data gateway 104 transmits the unfragmented encrypted data packets to the master base station 106A. Also, at step 676, the data gateway 104 transmits the unfragmented encrypted data packets to the slave base station 106B.

At step 678, the master base station 106A transmits MAC PDU(s) carrying the encrypted data packets to the mobile station 108. In one embodiment, the MAC PDU(s) carries unfragmented data packets. In another embodiment, the MAC PDU(s) carries fragmented data packets. Additionally, at step 680, the master base station 106A transmits control information to the slave base station 106B. The control information indicates the slave base station 1068 that the encrypted data packets are to be directly transmitted to the mobile station 108.

At step 682, the slave base station 106B transmits the MAC PDU(s) carrying the encrypted data packets to the mobile station 108 based on the control information. In one embodiment, the MAC PDU(s) carries unfragmented data packets. In another embodiment, the MAC PDU(s) carries fragmented data packets. At step 684, the mobile station 108 unpacks the encrypted data packets from the received MAC PDU(s). At step 686, the mobile station 108 decrypts the encrypted data packets using one or more data security keys established at the mobile station 102. In some embodiments, the mobile station 108 may unpack and decrypt the encrypted data packets received from the master base station 106A or the slave base station 106B.

Figure 7A:
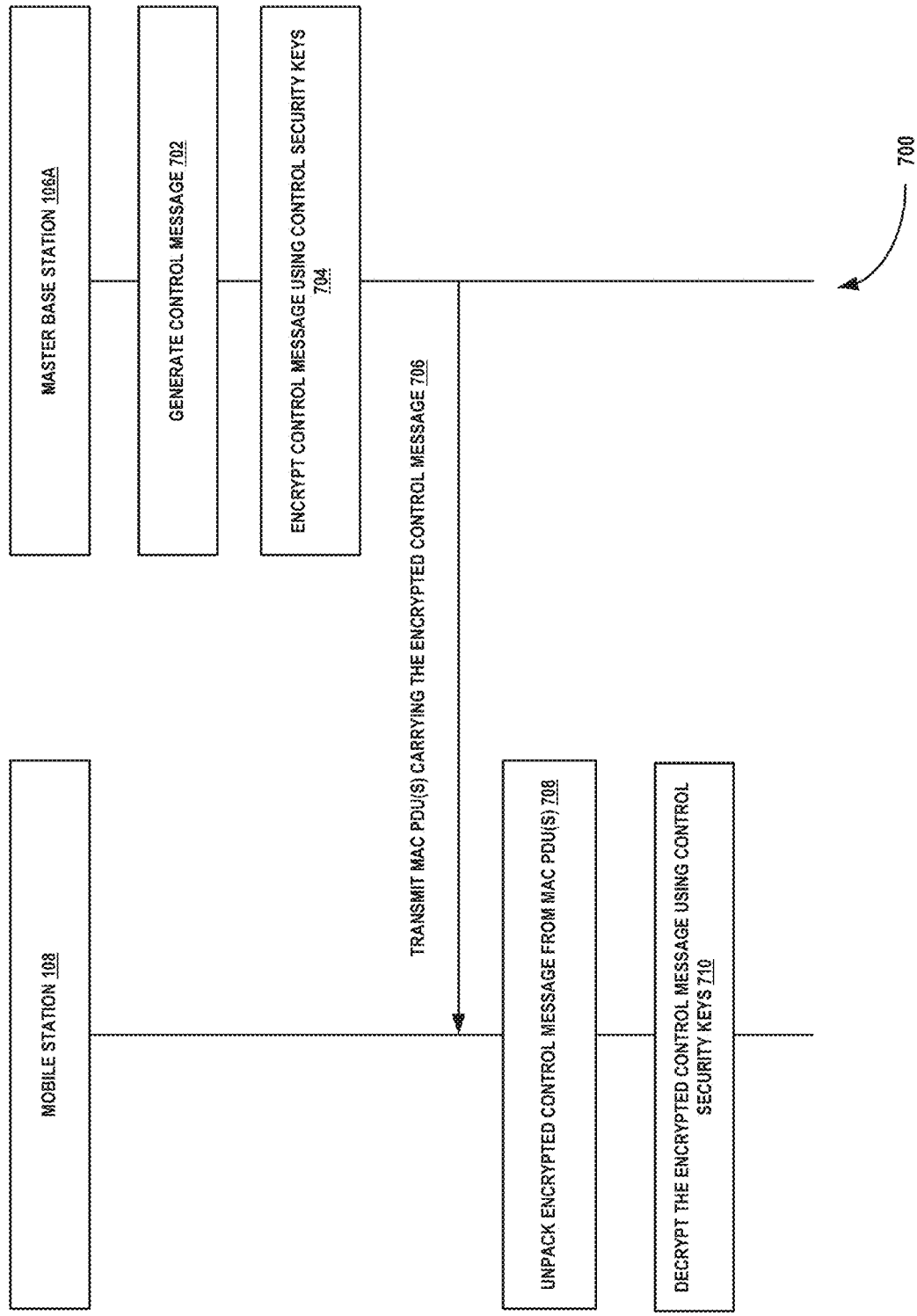
FIG. 7A is a flow diagram illustrating an exemplary method of securely communicating control packets from the master base station to the mobile station, according to one embodiment.

FIG. 7A is a flow diagram 700 illustrating an exemplary method of securely communicating control packets from the master base station 106A to the mobile station 108, according to one embodiment. When the master base station 106A wishes to securely transmit control information to the mobile station 108, the master base station 106A generates a control message containing control information, at step 702. At step 704, the master base station 106A encrypts the control message using one or more control security keys established at the master base station 106A for secured communication of control messages.

At step 706, the master base station 106A transmits MAC PDU(s) carrying the encrypted control message to the mobile station 108. In one embodiment, the MAC PDU(s) carries unfragmented control message. In another embodiment, the MAC PDU(s) carries fragmented control message. At step 708, the mobile station 108 unpacks the encrypted control message from the MAC PDU(s). At step 710, the mobile station 108 decrypts the encrypted control message using one or more control security keys established at the mobile station 108.

Figure 7B:
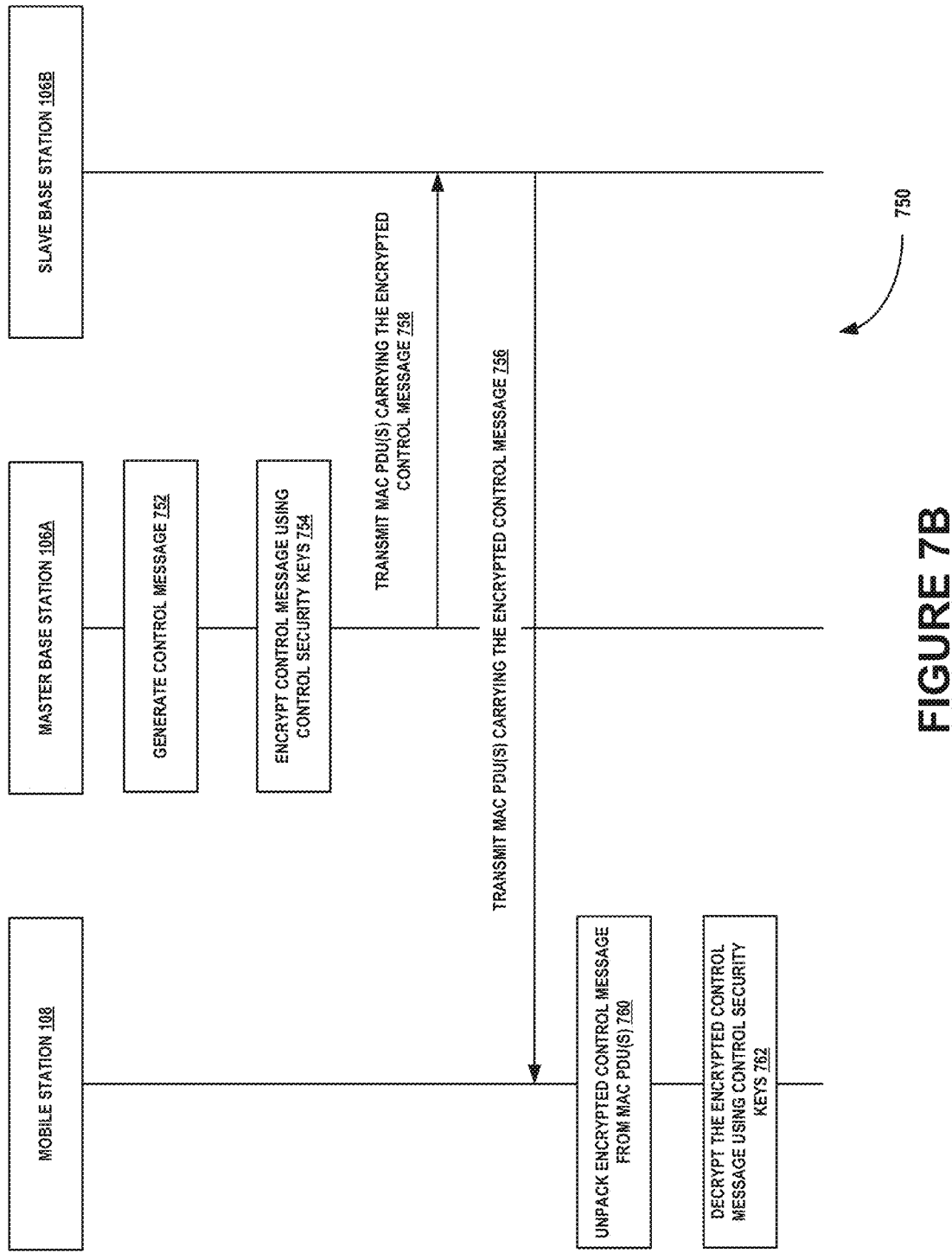
FIG. 7B is a flow diagram illustrating an exemplary method of securely communicating control packets from the master base station to the mobile station, according to another embodiment.

FIG. 7B is a flow diagram 750 illustrating an exemplary method of securely communicating control packets from the master base station 106A to the mobile station 108, according to another embodiment. At step 752, the master base station 106A generates a control message containing control information. At step 754, the master base station 106A encrypts the control message using one or more control security keys established at the master base station 106A for secured communication of control messages.

At step 756, the master base station 106A transmits MAC PDU(s) carrying the encrypted control message to the slave base station 106B. In one embodiment, the MAC PDU(s) carries unfragmented control message. In another embodiment, the MAC PDU(s) carries fragmented control message. At step 758, the slave base station 106B transmits the MAC PDU(s) carrying the encrypted control message to the mobile station 108. At step 760, the mobile station 108 unpacks the encrypted control message from the MAC PDU(s). At step 762, the mobile station 108 decrypts the encrypted control message using one or more control security keys established at the mobile station 108.

Figure 7C:
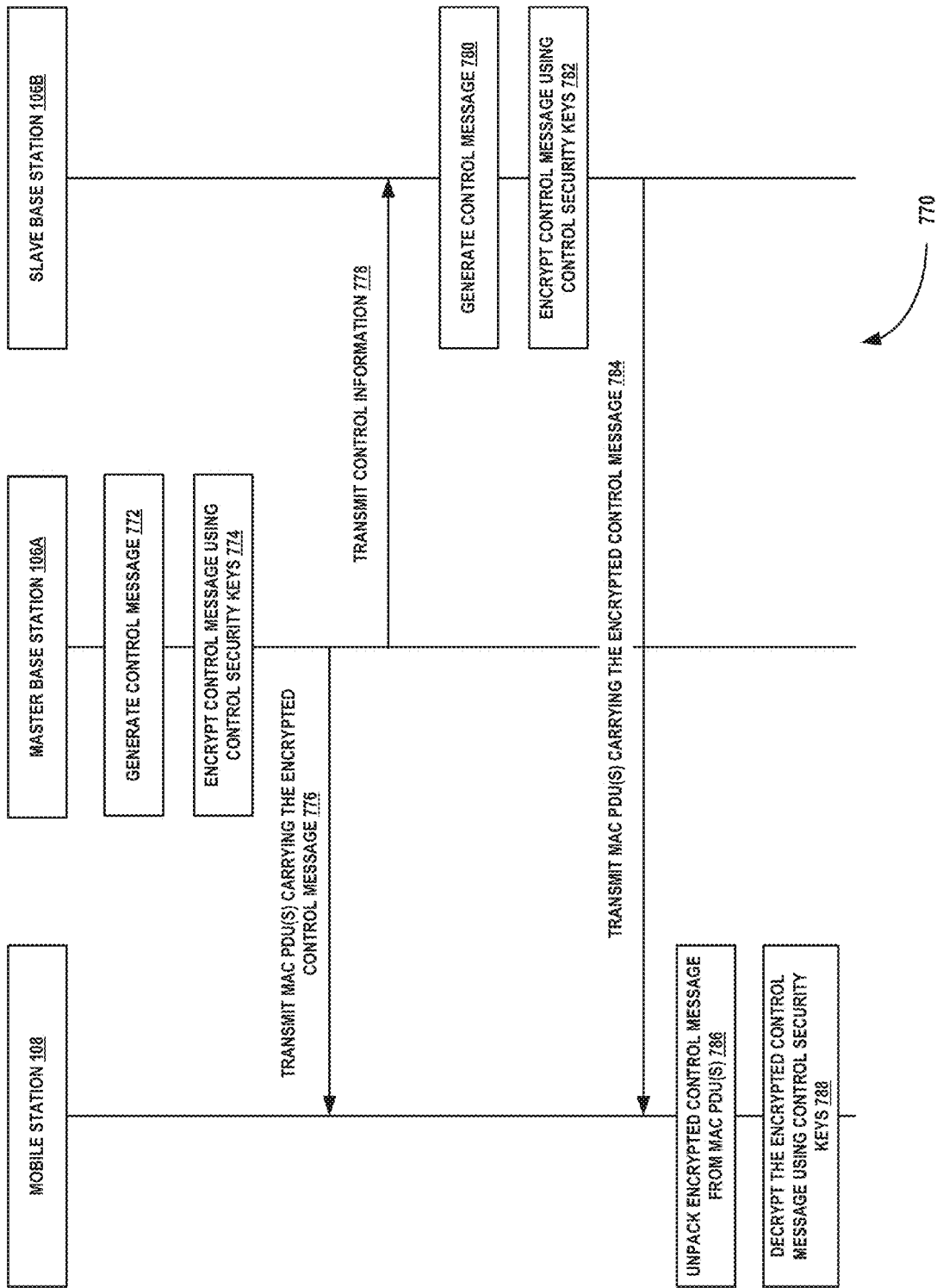
FIG. 7C is a flow diagram illustrating an exemplary method of securely communicating control packets from the master base station and the slave base station to the mobile station, according to yet embodiment.

FIG. 7C is a flow diagram 770 illustrating an exemplary method of securely communicating control packets from the master base station 106A and the slave base station 106B to the mobile station 108, according to yet another embodiment. At step 772, the master base station 106A generates a control message carrying control information intended for the mobile station 108. At step 774, the master base station 106A encrypts the control message using one or more control security keys established at the master base station 106A. At step 776, the master base station 106A transmits MAC PDU(s) carrying the encrypted control message to the mobile station 108. In one embodiment, the MAC PDU(s) carries unfragmented control message. In another embodiment, the MAC PDU(s) carries fragmented control message.

At step 778, the master base station 106A transmits control information to the slave base station 106B. The control information indicates that the slave base station 106B needs to transmit the encrypted control message to the mobile station 108. Accordingly, at step 780, the slave base station 106B generates a control message carrying the control information. At step 782, the slave base station 106B encrypts the control message using one or more control security keys established at the slave base station 106B. At step 784, the slave base station 106B transmits MAC PDU(s) carrying the encrypted control message to the mobile station 108. In one embodiment, the MAC PDU(s) carries unfragmented control message. In another embodiment, the MAC PDU(s) carries fragmented control message. At step 786, the mobile station 108 unpacks the encrypted control message from the MAC PDU(s) received from the master base station 106A or the slave base station 106B. At step 788, the mobile station 108 decrypts the encrypted control message using one or more control security keys established at the mobile station 108.

Figure 8:
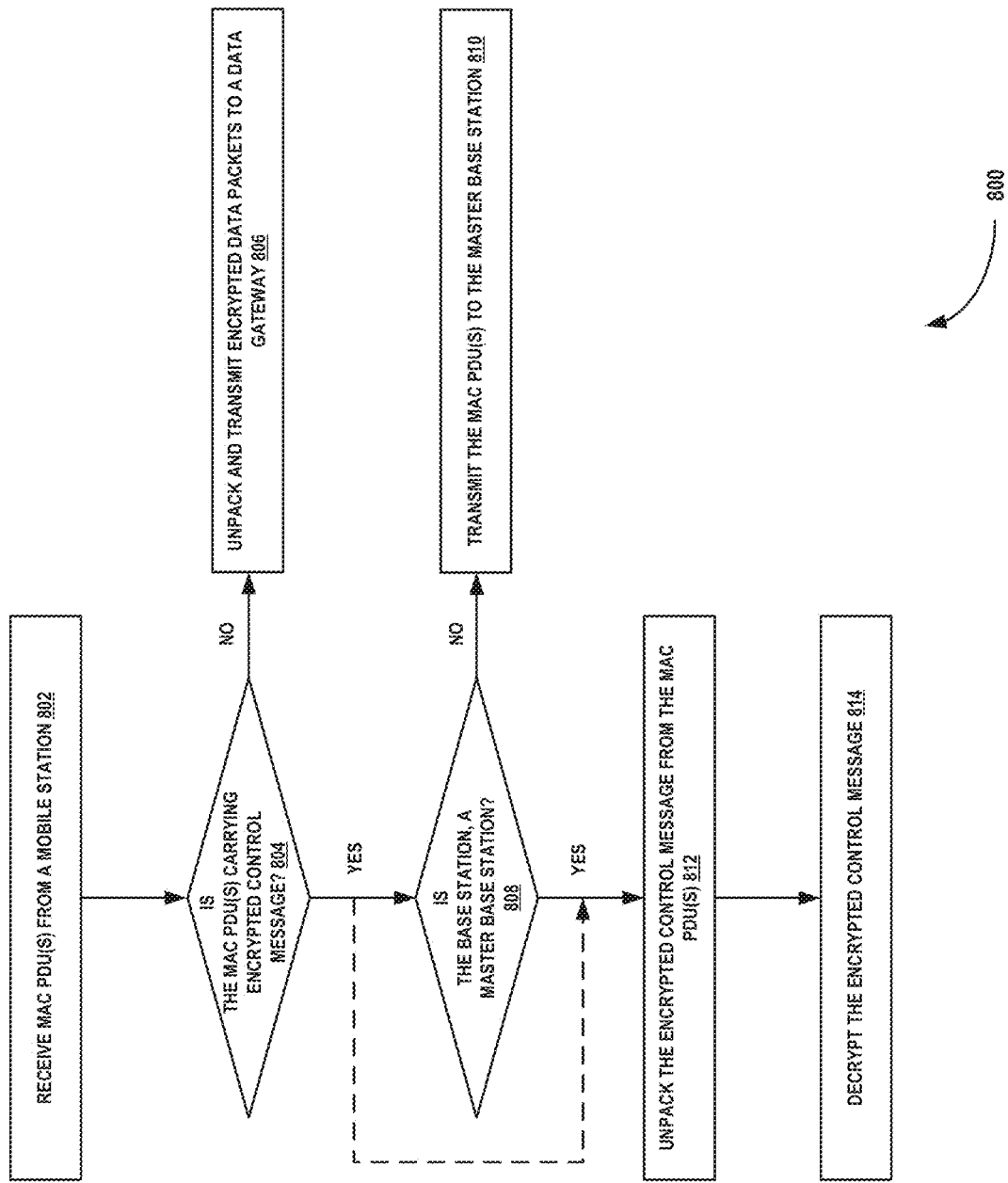
FIG. 8 is a process flowchart illustrating an exemplary method of processing Medium Access Control (MAC) Packet Data Unit (PDU)(s) received from the mobile station, according to one embodiment.

FIG. 8 is a process flowchart 800 illustrating an exemplary method of processing MAC PDU(s) received from the mobile station 108, according to one embodiment. The process steps 802 to 814 are performed by the master base station 106A or the slave base station 106B of a cloud cell to which a mobile station belongs.

At step 802, MAC PDU(s) is received from the mobile station 108. At step 804, it is determined whether the received MAC PDU(s) carry encrypted control message. If the received MAC PDU(s) does not carry encrypted control message, then it implies that the MAC PDU(s) carry encrypted data packets. Thus, at step 806, the encrypted data packets are unpacked from the MAC PDU(s) and transmitted to the data gateway 104 for further processing. However, if, at step 804, it is determined that the MAC PDU(s) does not carry the encrypted control message, then at step 808, it is determined whether the base station of the cloud cell to which the mobile station 108 belongs is a master base station.

If the base station is not a master base station, then at step 810, the MAC PDU(s) carrying the encrypted control message is transmitted to the master base station. If the base station is a master base station, then at step 812, the encrypted control message is unpacked from the MAC PDU(s). Further, at step 814, the encrypted control message is decrypted using one or more control security keys established at the base station for further processing. It can be noted that, when the master base station and the slave base station are configured for receiving encrypted control message and decrypting the encrypted control message, the base station may skip the step 808 and directly unpack and decrypt the encrypted control message as indicated through a dotted arrow line.

Figure 9:
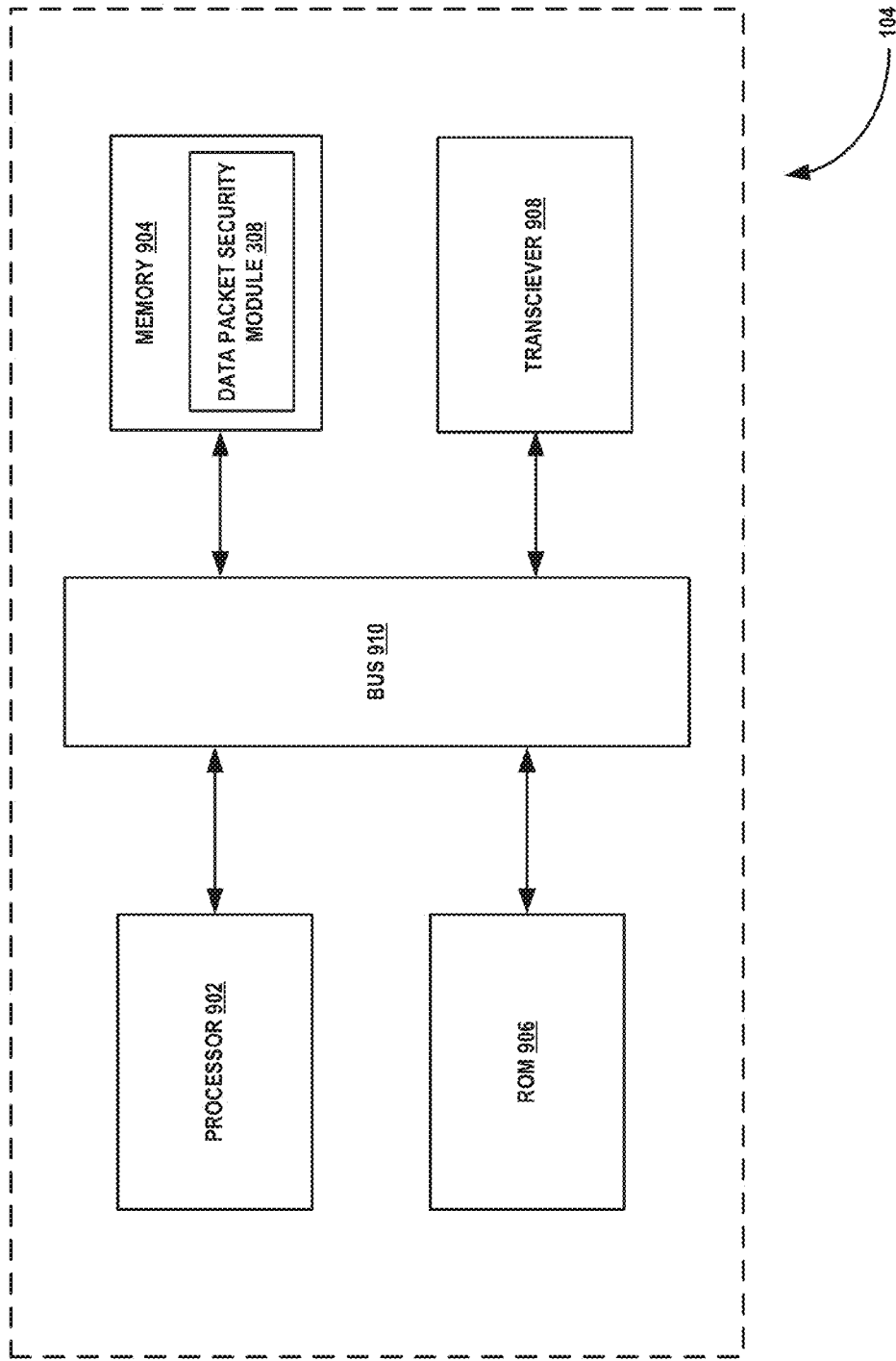
FIG. 9 is a block diagram of an exemplary data gateway showing various components for implementing embodiments of the present subject matter.

FIG. 9 is a block diagram of the data gateway 104 showing various components for implementing embodiments of the present subject matter. Referring to FIG. 9, the data gateway 104 includes a processor 902, a memory 904, a read only memory (ROM) 906, a transceiver 908, and a bus 910.

The processor 902, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 902 may also include embedded controllers, such as generic or programmable logic devices or arrays, application specific integrated circuits, single-chip computers, smart cards, and the like.

The memory 904 and the ROM 906 may be volatile memory and non-volatile memory. The memory 904 includes a data packet security module 308 for generating one or more data security keys, encrypting data packets intended for a mobile station and decrypting data packets received from a mobile station using the one or more data security keys, according to one or more embodiments described above. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like.

Embodiments of the present subject matter may be implemented in conjunction with modules, including functions, procedures, data structures, and application programs, for performing tasks, or defining abstract data types or low-level hardware contexts. The data packet security module 308 may be stored in the form of machine-readable instructions on any of the above-mentioned storage media and may be executed by the processor 902. For example, a computer program may include machine-readable instructions which when executed by the processor 902, may cause the processor 902 to generate one or more data security keys, encrypt data packets intended for the mobile station 108 using the one or more data security keys and decrypt data packets received from a mobile station using the one or more data security keys, according to the teachings and herein described embodiments of the present subject matter. In one embodiment, the program may be included on a compact disk-read only memory (CD-ROM) and loaded from the CD-ROM to a hard drive in the non-volatile memory.

The transceiver 908 may be capable of transmitting encrypted data packets and receiving encrypted data packets. The bus 910 acts as interconnect between various components of the data gateway 104.

Figure 10:
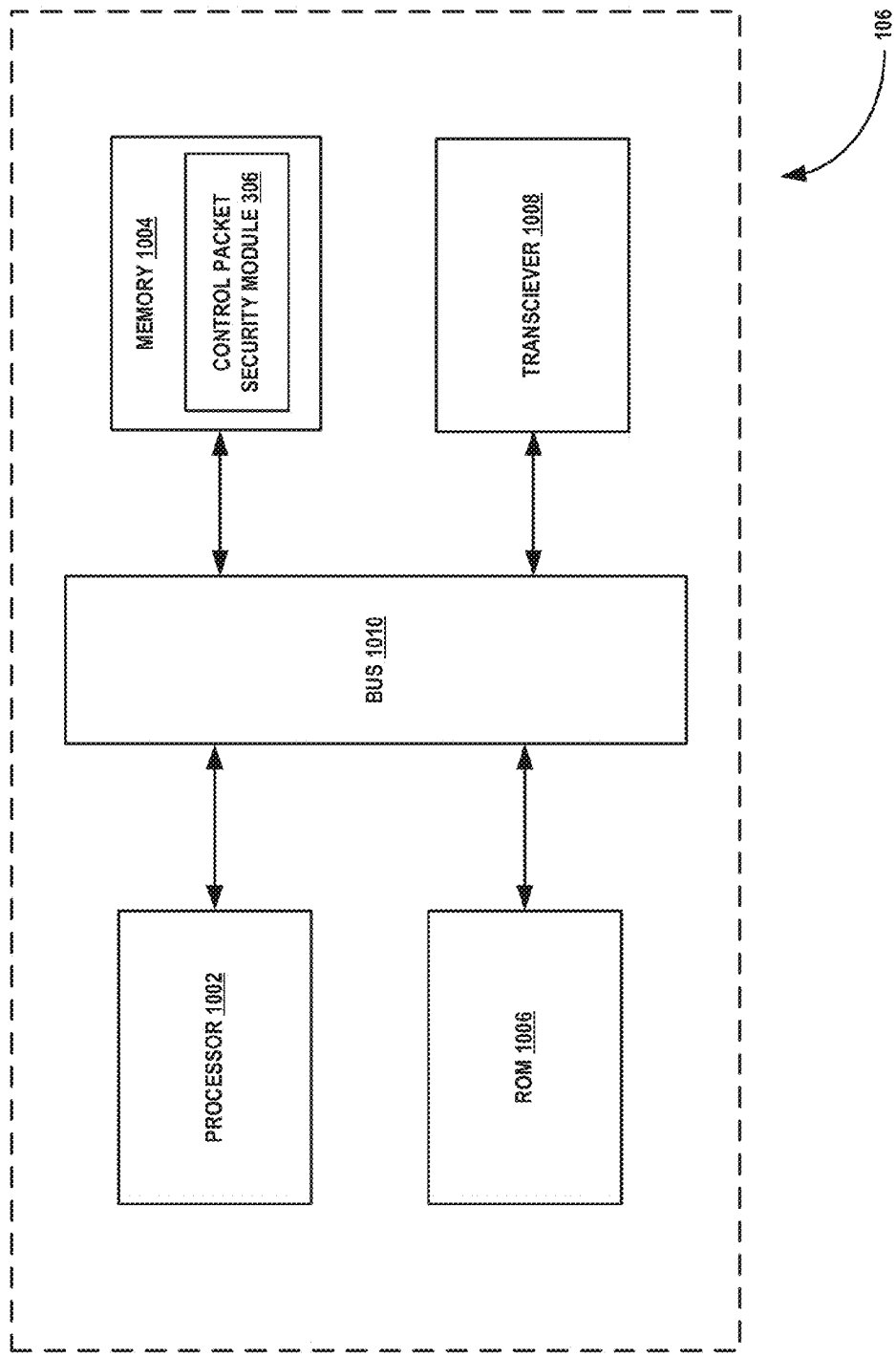
FIG. 10 is a block diagram of an exemplary base station showing various components for implementing embodiments of the present subject matter.

FIG. 10 is a block diagram of the base station 106 showing various components for implementing embodiments of the present subject matter. Referring to FIG. 10, the base station 106 includes a processor 1002, a memory 1004, a read only memory (ROM) 1006, a transceiver 1008, and a bus 1010.

The processor 1002, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1002 may also include embedded controllers, such as generic or programmable logic devices or arrays, application specific integrated circuits, single-chip computers, smart cards, and the like.

The memory 1004 and the ROM 1006 may be volatile memory and non-volatile memory. The memory 1004 includes a control packet security module 306 for generating one or more control security keys, encrypting control messages intended for the mobile station 108 and decrypting control message received from the mobile station 108 using the one or more control security keys, according to one or more embodiments described above. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like.

Embodiments of the present subject matter may be implemented in conjunction with modules, including functions, procedures, data structures, and application programs, for performing tasks, or defining abstract data types or low-level hardware contexts. The control packet security module 306 may be stored in the form of machine-readable instructions on any of the above-mentioned storage media and may be executed by the processor 1002. For example, a computer program may include machine-readable instructions which when executed by the processor 1002, may cause the processor 1002 to generate one or more control security keys, encrypt control messages intended for the mobile station 108 and decrypt control message received from the mobile station 108 using the one or more control security keys, according to the teachings and herein described embodiments of the present subject matter. In one embodiment, the program may be included on a compact disk-read only memory (CD-ROM) and loaded from the CD-ROM to a hard drive in the non-volatile memory.

The transceiver 1008 may be capable of transmitting MAC PDU(s) carrying encrypted data packets/encrypted control message to the mobile station 108 and receiving MAC PDU(s) carrying encrypted data packets/encrypted control message from the mobile station 108. Also, the transceiver 1008 may be capable of transmitting encrypted data packets to the data gateway 104 and receiving encrypted data packets from the data gateway 104. The bus 1010 acts as interconnect between various components of the base station 106.

Figure 11:
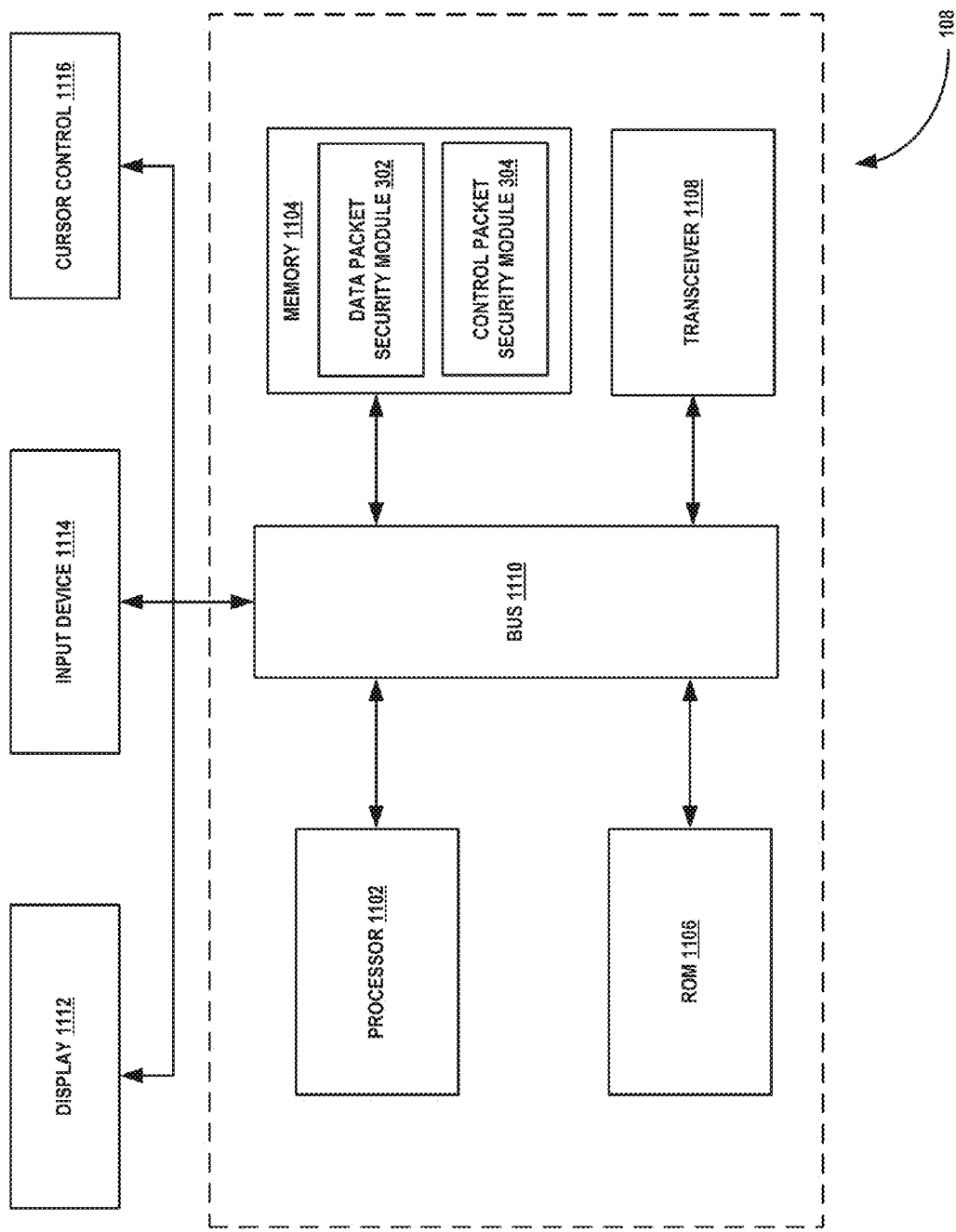
FIG. 11 is a block diagram of an exemplary mobile station showing various components for implementing embodiments of the present subject matter.
Figure 12A:
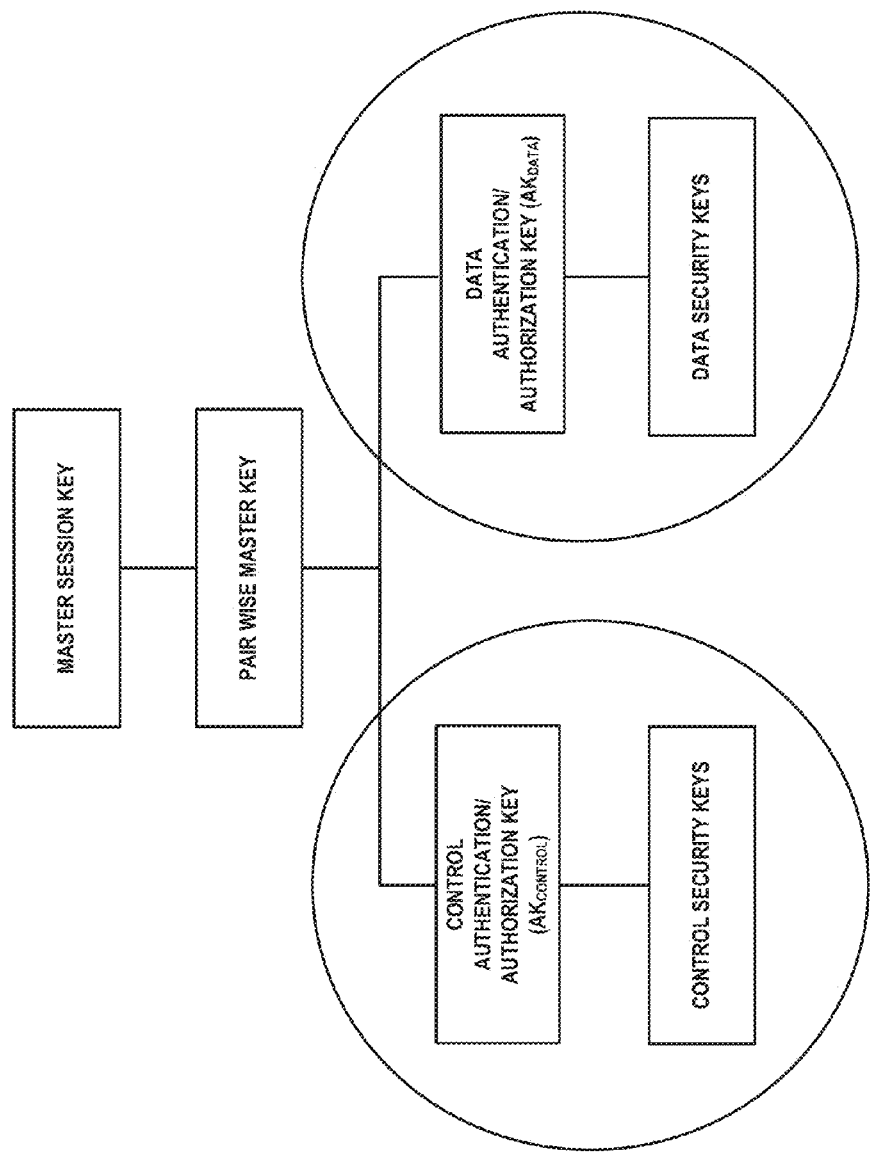
FIGS. 12A-12D are diagrammatic representations illustrating hierarchy of keys, according to one embodiment.
Figure 12B:
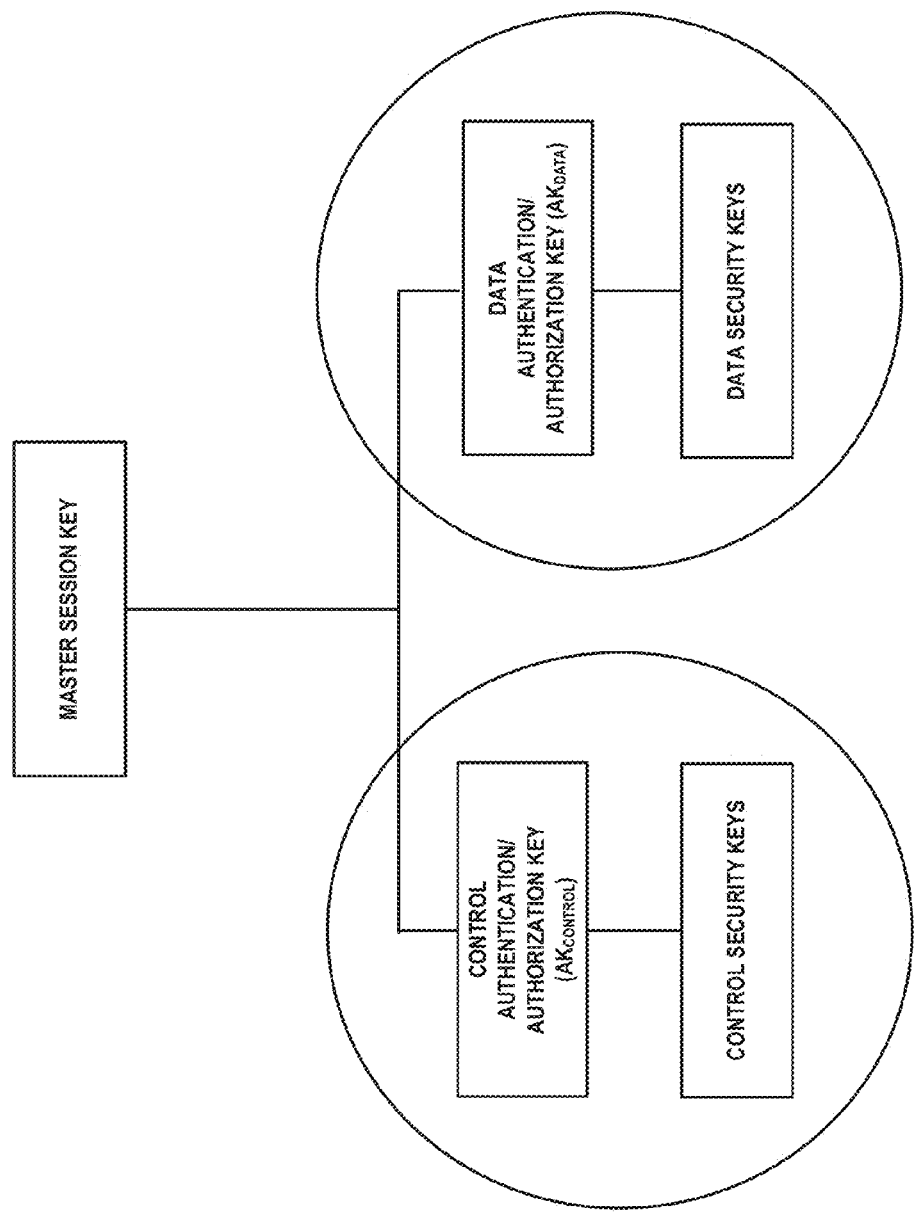
Figure 12C:
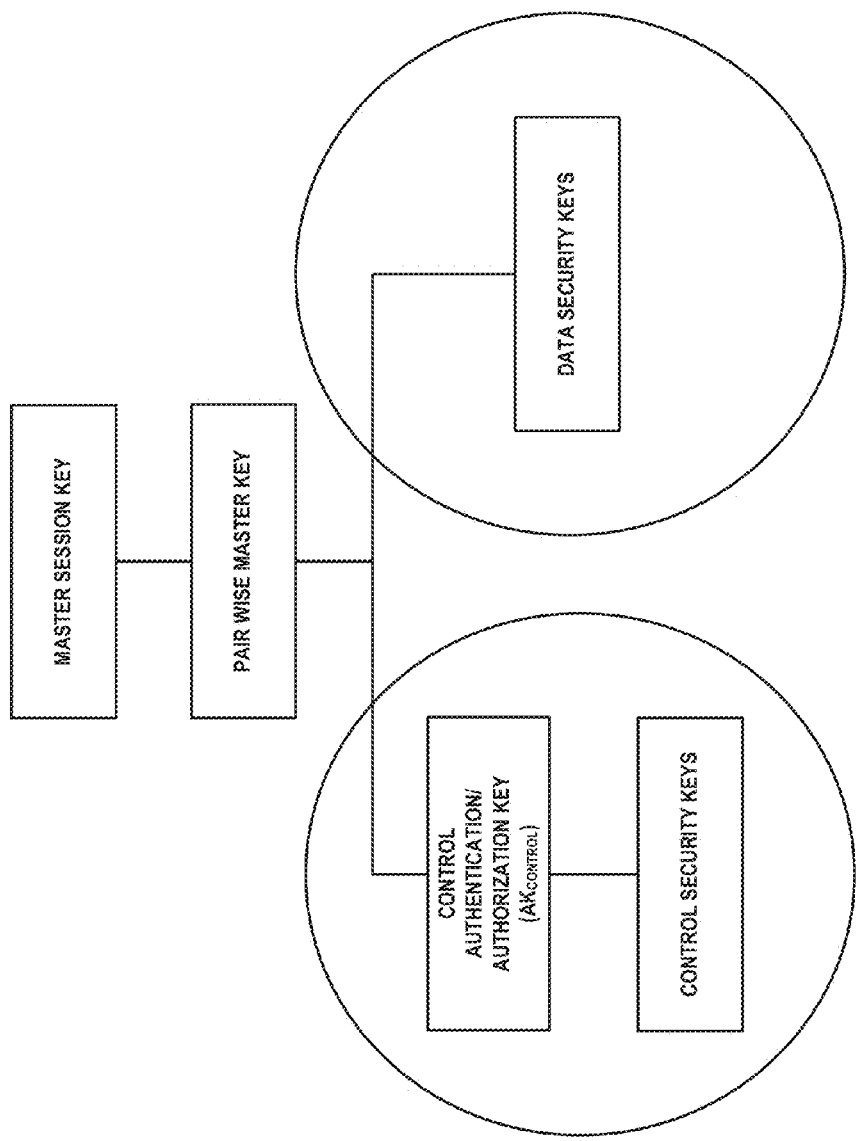
Figure 12D:
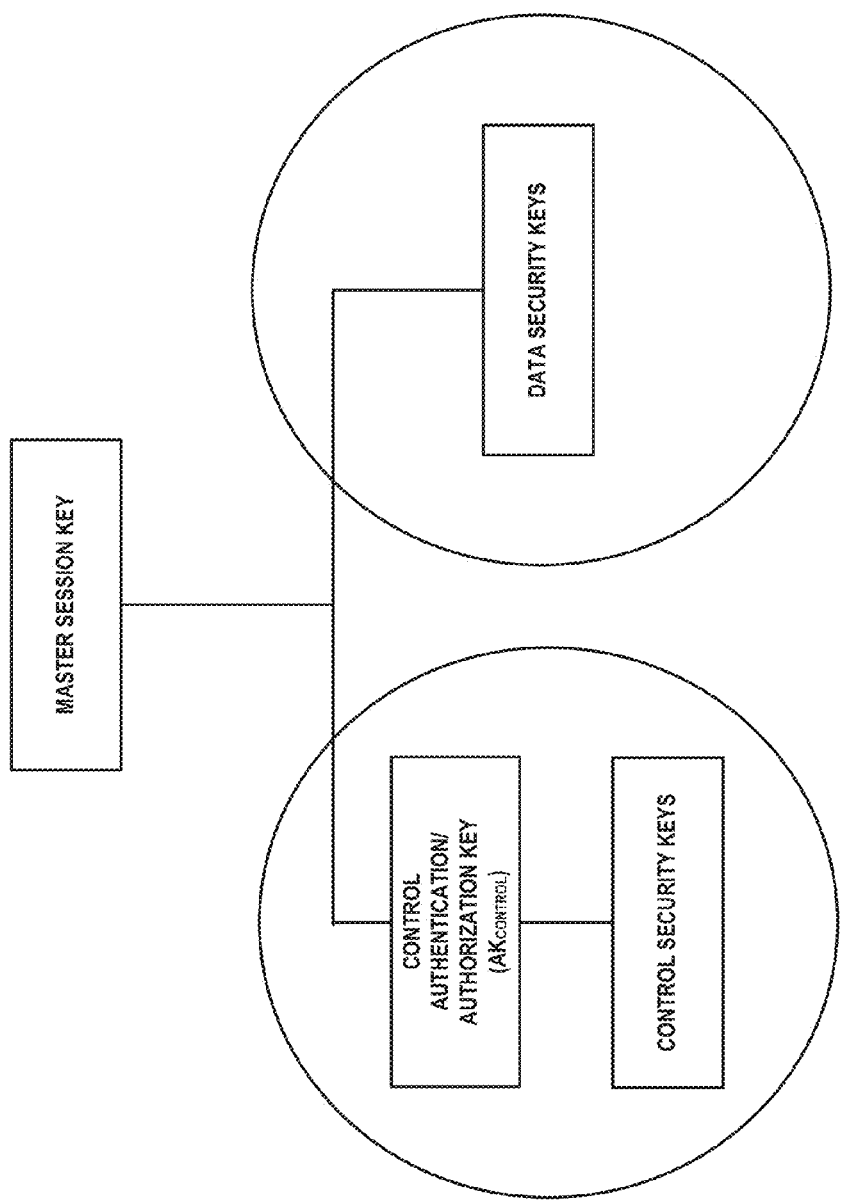

FIG. 11 is a block diagram of the mobile station 108 showing various components for implementing embodiments of the present subject matter. Referring FIG. 11, the mobile station 108 includes a processor 1102, memory 1104, a read only memory (ROM) 1106, a transceiver 1108, a bus 1110, a display 1112, an input device 1114, and a cursor control 1116.

The processor 1102, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1102 may also include embedded controllers, such as generic or programmable logic devices or arrays, application specific integrated circuits, single-chip computers, smart cards, and the like.

The memory 1104 and the ROM 1106 may be volatile memory and non-volatile memory. The memory 1104 includes a data packet security module 302 for generating one or more data security keys, encrypting data packets intended for a mobile station and decrypting data packets received from a mobile station using one or more data security keys, and a control packet security module 304 for generating one or more control security keys, encrypting control messages intended for a mobile station and decrypting control message received from a mobile station using the one or more control security keys, according to one or more embodiments described above. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like.

Embodiments of the present subject matter may be implemented in conjunction with modules, including functions, procedures, data structures, and application programs, for performing tasks, or defining abstract data types or low-level hardware contexts. The data packet security module 302 and the control packet security module 304 may be stored in the form of machine-readable instructions on any of the above-mentioned storage media and may be executed by the processor 1102. For example, a computer program may include machine-readable instructions, that when executed by the processor 1102, cause the processor 1102 to encrypt data packets/control messages and decrypt data packets/control messages, according to the teachings and herein described embodiments of the present subject matter. In one embodiment, the computer program may be included on a compact disk-read only memory (CD-ROM) and loaded from the CD-ROM to a hard drive in the non-volatile memory.

The transceiver 1108 may be capable of transmitting MAC PDU(s) carrying encrypted data packets/encrypted control message to the base station 106 and receiving MAC PDU(s) carrying encrypted data packets/encrypted control message from the base station 106. The bus 1110 acts as interconnect between various components of the mobile station 108. The components such as the display 1112, the input device 1114, and the cursor control 1116 are well known to the person skilled in the art and hence the explanation is thereof omitted.

The present embodiments have been described with reference to specific example embodiments; it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for secured communication of data packets by a data gateway in a mobile broadband network environment, the method comprising:
   receiving one or more data packets intended for a mobile station from a packet data network;
   encrypting the one or more data packets to be transmitted from the data gateway to the mobile station using one or more security keys established at the data gateway for secured communication with the mobile station; and
   transmitting the encrypted one or more data packets to the mobile station via a plurality of base stations connected to the data gateway,
   wherein the one or more security keys established at the data gateway are continuously used while the mobile station communicates with at least one base station among the plurality of base stations connected to the data gateway,
   wherein the one or more security keys established at the data gateway are generated based on an identifier of the mobile station and an identifier of the data gateway, and
   wherein data packets encrypted at the data gateway using the one or more security keys established at the data gateway can be decrypted only by the mobile station.

2. The method of claim 1, wherein the encrypting of the one or more data packets comprises:
   receiving one of a pair wise master key (PMK) and a master session key (MSK) from an authenticator;
   generating an authentication and authorization key using the identifier of the mobile station, the identifier of the data gateway, and one of the PMK and the MSK;
   generating the one or more security keys for encrypting the data packets using the authentication and authorization key; and
   encrypting the one or more data packets using the one or more security keys.

3. The method of claim 1, wherein the encrypting of the one or more data packets comprises:
   receiving an authentication and authorization key for generating the one or more security keys from an authenticator;
   generating the one or more security keys for encrypting the one or more data packets using the authentication and authorization key; and
   encrypting the one or more data packets using the one or more security keys.

4. The method of claim 1, wherein the encrypting of the one or more data packets comprises:
   receiving one of a pair wise master key (PMK) and a master session key (MSK) from an authenticator;
   generating the one or more security keys for encrypting the one or more data packets using the identifier of the mobile station, the identifier of the data gateway, and one of the PMK and the MSK; and
   encrypting the one or more data packets using the one or more security keys.

5. The method of claim 1, wherein the encrypting of the one or more data packets using the one or more security keys comprises:
   applying one of a privacy protection and an integrity protection to the one or more data packets using the one or more security keys received from an authenticator.

6. A data gateway comprising:
   a transceiver; and
   a processor coupled to the transceiver, wherein the transceiver is configured to receive one or more data packets intended for a mobile station from a packet data network,
   wherein the processor is configured to encrypt the one or more data packets to be transmitted from the data gateway to the mobile station using one or more security keys established at the data gateway for secured communication with the mobile station,
   wherein the transceiver is configured to transmit the encrypted one or more data packets to the mobile station via a plurality of base stations connected to the data gateway,
   wherein the one or more security keys established at the data gateway are continuously used while the mobile station communicates with at least one base station among the plurality of base stations connected to the data gateway,
   wherein the one or more security keys established at the data gateway are generated based on an identifier of the mobile station and an identifier of the data gateway, and
   wherein data packets encrypted at the data gateway using the one or more security keys established at the data gateway can be decrypted only by the mobile station.

7. The data gateway of claim 6, wherein the processor is further configured to:
   receive one of a pair wise master key (PMK) and a master session key (MSK) from an authenticator;
   generate an authentication and authorization key using the identifier of the mobile station, the identifier of the data gateway, and one of the PMK and the MSK;
   generate the one or more security keys for encrypting the one or more data packets using the authentication and authorization key; and
   encrypt the one or more data packets using the one or more security keys.

8. The data gateway of claim 6, wherein the processor is further configured to:
   receive one of a pair wise master key (PMK) and a master session key (MSK) from an authenticator;

generate the one or more security keys for encrypting the one or more data packets using the identifier of the mobile station, the identifier of the data gateway, and one of the PMK and the MSK; and encrypt the one or more data packets using the one or more security keys.

9. A method for processing data packets by a data gateway in a mobile broadband network environment, the method comprising:

receiving one or more encrypted data packets from a mobile station via a plurality of base stations connected to the data gateway;

decrypting the encrypted one or more data packets from the mobile station using one or more security keys established at the data gateway for secured communication with the mobile station; and transmitting the decrypted one or more data packets to the packet data network, wherein the one or more security keys established at the data gateway are continuously used while the mobile station communicates with at least one base station among the plurality of base stations connected to the data gateway, wherein the one or more security keys established at the data gateway are generated based on an identifier of the mobile station and an identifier of the data gateway, and wherein the encrypted one or more data packets received from the mobile station can be decrypted only by using the one or more security keys established at the data gateway.

10. The method of claim 9, wherein the decrypting of the encrypted one or more data packets comprises:

receiving one of a pair wise master key (PMK) and a master session key (MSK) from an authenticator;

generating an authentication and authorization key using the identifier of the mobile station, the identifier of the data gateway, and one of the PMK and the MSK;

generating the one or more security keys for decrypting the one or more encrypted data packets using the authentication and authorization key; and decrypting the encrypted one or more data packets using the one or more security keys.

11. The method of claim 9, wherein the decrypting of the encrypted one or more data packets comprises:

receiving an authentication and authorization key for generating the one or more security keys from an authenticator;

generating the one or more security keys for decrypting the encrypted data packets using the authentication and authorization key; and decrypting the encrypted one or more data packets using the one or more security keys.

12. The method of claim 9, wherein the decrypting of the encrypted one or more data packets comprises:

receiving one of a pair wise master key (PMK) and a master session key (MSK) from an authenticator;

generating the one or more security keys for decrypting the encrypted one or more data packets using the identifier of the mobile station, the identifier of the data gateway, and one of the PMK and the MSK; and decrypting the encrypted one or more data packets using the one or more security keys.

13. The method of claim 9, wherein decrypting the encrypted one or more data packets using the one or more security keys comprises:

applying one of a privacy protection and an integrity protection to the data packets using the one or more security keys received from an authenticator.

14. A data gateway comprising:

a transceiver; and a processor coupled to the transceiver, wherein the transceiver is configured to receive one or more encrypted data packets from a mobile station via a plurality of base stations connected to the data gateway, wherein the processor is configured to decrypt the encrypted one or more data packets from the mobile station using one or more security keys established at the data gateway for secured communication with the mobile station, wherein the transceiver is configured to transmit the decrypted one or more data packets to the packet data network, wherein the one or more security keys established at the data gateway are continuously used while the mobile station communicates with at least one base station among the plurality of base stations connected to the data gateway, wherein the one or more security keys established at the data gateway are generated based on an identifier of the mobile station and an identifier of the data gateway, and wherein the encrypted one or more data packets received from the mobile station can be decrypted only by using the one or more security keys established at the data gateway.

15. The data gateway of claim 14, wherein the processor is further configured to:

receive one of a pair wise master key (PMK) and a master session key (MSK) from an authenticator;

generate an authentication and authorization key using the identifier of the mobile station, the identifier of the data gateway, and one of the PMK and the MSK;

generate the one or more security keys for decrypting the encrypted one or more data packets using the authentication and authorization key; and decrypt the encrypted one or more data packets using the one or more security keys.

16. The data gateway of claim 14, wherein the processor is further configured to:

receive an authentication and authorization key for generating the one or more security keys from an authenticator;

generate the one or more security keys for decrypting the encrypted data packets using the authentication and authorization key; and decrypt the encrypted one or more data packets using the one or more security keys.

17. The data gateway of claim 14, wherein the processor is further configured to:

receive one of a pair wise master key (PMK) and a master session key (MSK) from an authenticator;

generate the one or more security keys for decrypting the encrypted one or more data packets using the identifier of the mobile station, the identifier of the data gateway, and one of the PMK and the MSK; and decrypt the encrypted one or more data packets using the one or more security keys.

18. The data gateway of claim 14, wherein the processor is further configured to:

apply one of a privacy protection and an integrity protection to the one or more data packets using the one or more security keys received from an authenticator.

19. A method for secured communication by a mobile station in a mobile broadband network environment, the method comprising:
generating a packet comprising one of a control message and a data packet;
encrypting the packet to be transmitted from the mobile station to a data gateway using one or more data security keys established at the mobile station for secured communication of data packets with the data gateway if the packet comprises the data packet, wherein the one or more data security keys are generated at the mobile station for the data gateway;
encrypting the packet to be transmitted from the mobile station to a base station using one or more control security keys established at the mobile station for secured communication of control messages with the base station if the packet comprises the control message, wherein the one or more control security keys are generated at the mobile station for the base station; and
transmitting the encrypted packet carrying the one of the control message and the data packet to the base station,
wherein the one or more data security keys established at the mobile station for secured communication of data packets with the data gateway are continuously used while the mobile station communicates with at least one base station among a plurality of base stations connected to the data gateway,
wherein the one or more data security keys established at the mobile station for secured communication of data packets with the data gateway are generated based on an identifier of the mobile station and an identifier of the data gateway,
wherein the one or more control security keys established at the mobile station for secured communication of control messages with the base station are generated based on the identifier of the mobile station and an identifier of the base station,
wherein data packets encrypted using the one or more data security keys established at the mobile station for secured communication of data packets with the data gateway can be decrypted only by the data gateway, and
wherein control messages encrypted using the one or more control security keys established at the mobile station for secured communication of control messages with the base station can be decrypted only by the base station.

20. The method of claim 19, wherein the encrypting of the packet comprises:
generating a data authentication and authorization key using the identifier of the mobile station, the identifier of the data gateway, and one of a pair wise master key (PMK) and a master session key (MSK);
generating the one or more data security keys for encrypting the packet carrying the data packet using the data authentication and authorization key; and
encrypting the packet using the one or more data security keys.

21. The method of claim 19, wherein the encrypting of the packet comprises:
generating the one or more data security keys for encrypting the packet carrying the data packet using the identifier of the mobile station, the identifier of the data gateway, and one of a pairwise master key (PMK) and a master session key (MSK); and
encrypting the packet using the one or more data security keys.

22. The method of claim 19, wherein the encrypting of the packet using the one or more data security keys comprises:
applying at least one of a privacy protection and an integrity protection to the packet carrying the data packet using the one or more data security keys.

23. The method of claim 19, wherein the encrypting of the packet comprises:
generating a control authentication and authorization key using the identifier of the mobile station, one of an identifier of a master base station and an identifier of a cloud cell associated with the mobile station, and one of a pair wise master key (PMK) and a master session key (MSK);
generating one or more control security keys for encrypting the packet carrying the control message using the control authentication and authorization key; and
encrypting the packet using the one or more control security keys.

24. The method of claim 19, wherein the encrypting of the packet comprises:
generating a control authentication and authorization key for respective base stations in a cloud cell using the identifier of the mobile station, an identifier of the respective base stations in a cloud cell associated with the mobile station, and one of a pair wise master key (PMK) and a master session key (MSK);
generating one or more control security keys for encrypting the packet carrying the control message using the control authentication and authorization key; and
encrypting the packet using the one or more control security keys.

25. The method of claim 19, wherein the encrypting of the packet using the one or more control security keys comprises:
applying at least one of a privacy protection and an integrity protection to the packet carrying the control message using the one or more control security keys.

26. A mobile station comprising:
a processor configured to:
generate a packet comprising one of a control message and a data packet,
encrypt the packet to be transmitted from the mobile station to a data gateway using one or more data security keys established at the mobile station for secured communication of data packets with the data gateway if the packet comprises the data packet, wherein the one or more data security keys are generated for the data gateway, and
encrypt the packet to be transmitted from the mobile station to a base station using one or more control security keys established at the mobile station for secured communication of control messages with the base station if the packet comprises the control message, wherein the one or more control security keys are generated for the base station; and
a transceiver configured to transmit the encrypted packet carrying the one of the control message and the data packet to the base station,
wherein the one or more data security keys established at the mobile station for secured communication of data packets with the data gateway are continuously used while the mobile station communicates with at least one base station among a plurality of base stations connected to the data gateway,
wherein the one or more data security keys established at the mobile station for secured communication of data packets with the data gateway are generated based on an identifier of the mobile station and an identifier of the data gateway, wherein the one or more control security keys established at the mobile station for secured communication of control messages with the base station are generated based on the identifier of the mobile station and an identifier of the base station, wherein data packets encrypted using the one or more data security keys established at the mobile station for secured communication of data packets with the data gateway can be decrypted only by the data gateway, and wherein control messages encrypted using the one or more control security keys established at the mobile station for secured communication of control messages with the base station can be decrypted only by the base station.

27. The mobile station of claim 26, wherein the processor is further configured to:
generate a data authentication and authorization key using the identifier of the mobile station, the identifier of the data gateway, and one of a pair wise master key (PMK) and a master session key (MSK);
generate the one or more data security keys for encrypting the packet carrying the data packet using the data authentication and authorization key; and
encrypt the packet using the one or more data security keys.

28. The mobile station of claim 26, wherein the processor is further configured to:
generate the one or more data security keys for encrypting the packet carrying the data packet using the identifier of the mobile station, the identifier of the data gateway, and one of a pair wise master key (PMK) and a master session key (MSK); and
encrypt the packet using the one or more data security keys.

29. The mobile station of claim 26, wherein the processor is further configured to:
generate a control authentication and authorization key using the identifier of the mobile station, one of an identifier of a master base station and an identifier of a cloud cell associated with the mobile station, and one of a pair wise master key (PMK) and a master session key (MSK);
generate one or more control security key for encrypting the packet carrying the control message using the control authentication and authorization key; and
encrypt the packet using the one or more control security keys.

30. The mobile station of claim 26, wherein the processor is further configured to:
generate a control authentication and authorization key for respective base stations in a cloud cell using the identifier of the mobile station, an identifier of the respective base stations in the cloud cell associated with the mobile station, and one of a pair wise master key (PMK) and a master session key (MSK);
generate one or more control security keys for encrypting the packet carrying the control message using the control authentication and authorization key; and
encrypt the packet using the one or more control security keys.

31. A method for processing packets by a base station in a mobile broadband network environment, the method comprising:

receiving an encrypted packet from a mobile station;
decrypting the encrypted packet using one or more control security keys established at the base station for secured communication with the mobile station if the encrypted packet comprises a control message; and
transmitting the encrypted packet to a data gateway if the encrypted packet comprises a data packet, wherein the data packet is encrypted by the mobile station based on one or more data security keys established at the mobile station for secured communication of data packets with the data gateway, and wherein the one or more data security keys established at the mobile station are continuously used while the mobile station communicates with at least one base station among a plurality of base stations connected to the data gateway.

32. The method of claim 31, wherein the decrypting of the encrypted packet comprises:
generating a control authentication and authorization key using an identifier of the mobile station, an identifier of the base station, and one of a pair wise master key (PMK) and a master session key (MSK);
generating the one or more control security keys for decrypting the packet comprising the control message using the control authentication and authorization key; and
decrypting the encrypted packet using the one or more control security keys.

33. The method of claim 31, wherein the transmitting of the encrypted packet to the data gateway comprises:
transmitting the encrypted packet comprising the data packet to the data gateway via a master base station if the base station receiving the encrypted packet from the mobile station comprises a slave base station; and
transmitting the encrypted packet comprising the control message to a master base station if the base station receiving the encrypted packet comprises a slave base station so that the master base station decrypts the encrypted packet using one or more control security keys established at the master base station.

34. A base station comprising:
a transceiver; and
a processor coupled to the transceiver,
wherein the transceiver is configured to receive an encrypted packet transmitted from a mobile station to the base station,
wherein the processor is configured to decrypt the encrypted packet using one or more control security keys established at the mobile station for secured communication with the base station if the encrypted packet comprises a control message, and
wherein the transceiver is configured to transmit the encrypted packet to a data gateway if the encrypted packet comprises a data packet, wherein the data packet is encrypted by the mobile station based on one or more data security keys established at the mobile station for secured communication of data packets with the data gateway, and wherein the one or more data security keys established at the mobile station are continuously used while the mobile station communicates with at least one base station among a plurality of base stations connected to the data gateway.

35. The base station of claim 34,
wherein in the transmitting of the encrypted packet to the data gateway, the transceiver is configured to transmit the encrypted packet comprising the data packet to the data gateway via a master base station if the base station receiving the encrypted packet from the mobile station comprises a slave base station, and wherein the transceiver is configured to transmit the encrypted packet comprising the control message to the master base station if the base station receiving the encrypted packet comprises the slave base station so that the master base station decrypts the encrypted packet using one or more control security keys established at the master base station.

* * * * *